US011221806B2

(12) United States Patent
Otani

(10) Patent No.: US 11,221,806 B2
(45) Date of Patent: Jan. 11, 2022

(54) PRINT SUPPORT APPARATUS, METHOD OF OPERATING PRINT SUPPORT APPARATUS, AND OPERATION PROGRAM

(71) Applicant: FUJIFILM CORPORATION, Tokyo (JP)

(72) Inventor: Hiroshi Otani, Tokyo (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 17/190,444

(22) Filed: Mar. 3, 2021

(65) Prior Publication Data

US 2021/0303229 A1 Sep. 30, 2021

(30) Foreign Application Priority Data

Mar. 30, 2020 (JP) .............................. JP2020-061595

(51) Int. Cl.
  *G06F 3/12* (2006.01)
  *G06F 3/0484* (2013.01)
  *G08B 5/22* (2006.01)

(52) U.S. Cl.
  CPC .......... *G06F 3/1208* (2013.01); *G06F 3/1207* (2013.01); *G06F 3/1253* (2013.01); *G06F 3/1293* (2013.01); *G06F 3/04847* (2013.01); *G06F 3/1238* (2013.01); *G08B 5/22* (2013.01)

(58) Field of Classification Search
None
See application file for complete search history.

(56) References Cited

U.S. PATENT DOCUMENTS

| 2010/0251111 | A1* | 9/2010 | Ozaki | G06F 3/1208 715/274 |
| 2010/0309515 | A1* | 12/2010 | Odagawa | G06F 3/1284 358/1.15 |
| 2016/0191750 | A1* | 6/2016 | Chung | H04N 1/6027 358/3.23 |
| 2016/0360071 | A1* | 12/2016 | Matsui | H04N 1/6033 |
| 2016/0373614 | A1* | 12/2016 | Okawa | G06F 3/1253 |
| 2019/0075221 | A1* | 3/2019 | Kubo | G06F 3/1205 |
| 2019/0082079 | A1* | 3/2019 | Watanabe | H04N 1/6086 |
| 2020/0184530 | A1* | 6/2020 | Anderson | A23G 9/322 |
| 2021/0055893 | A1* | 2/2021 | Saigusa | G06F 3/1208 |
| 2021/0165622 | A1* | 6/2021 | Fujino | G06F 3/1292 |

FOREIGN PATENT DOCUMENTS

| JP | 2007-295590 A | 11/2007 |
| JP | 2015-070506 A | 4/2015 |

\* cited by examiner

*Primary Examiner* — Fan Zhang
(74) *Attorney, Agent, or Firm* — Solaris Intellectual Property Group, PLLC

(57) ABSTRACT

A print support apparatus that receives a print target image selected in a terminal apparatus having a display unit, on which image browsing is possible, and instructs a printer to perform image print includes at least one processor. The processor is configured to generate a terminal setting history by receiving and recording a terminal setting value, which is transmitted in a case where a specific event occurs and is involved in image browsing, from at least one terminal apparatus, specify the terminal setting value having a longest image browsing time as a reference setting value based on the terminal setting history, and correct a characteristic of the print target image based on the reference setting value.

13 Claims, 24 Drawing Sheets

| USER ID | TERMINAL ID | CLASSIFICATION OF EVENT | TERMINAL SETTING VALUE | TIME |
|---|---|---|---|---|
| U001 | M01 | IMAGE BROWSING START | L1 | t2 |

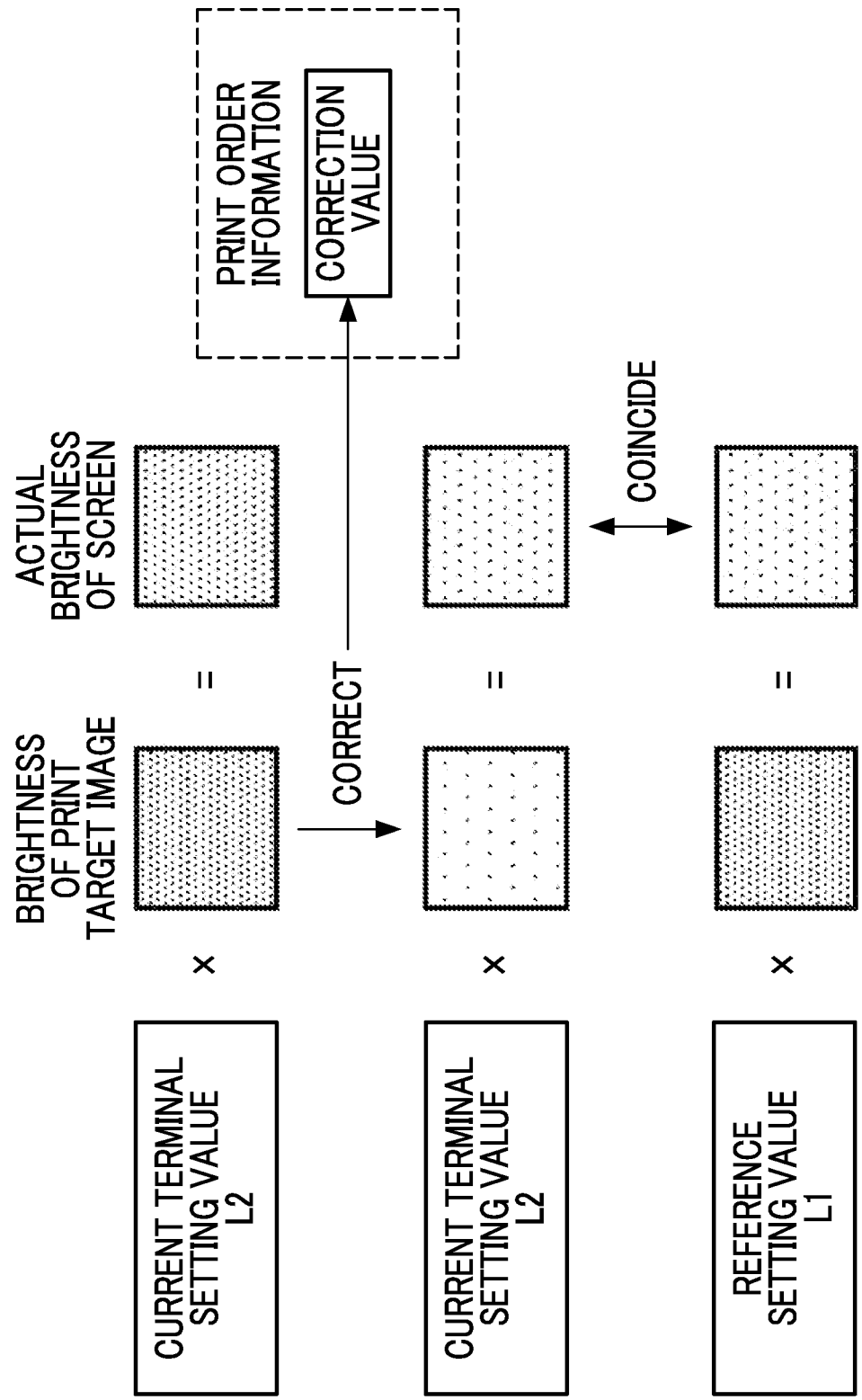

FIG. 14

| USER ID | TERMINAL ID | CLASSIFICATION OF EVENT | TERMINAL SETTING VALUE | TIME |
|---|---|---|---|---|
| U001 | M01 | LOGIN | L1 | t1 |
| U001 | M01 | IMAGE BROWSING START | L1 | t2 |
| U001 | M01 | REGULAR TRANSMISSION (DURING BROWSING) | L1 | t3 |
| U001 | M01 | SLEEP ON | L2 | t4 |
| U001 | M01 | SLEEP OFF | L3 | t5 |
| U001 | M01 | REGULAR TRANSMISSION (DURING BROWSING: NIGHTTIME MODE) | L3 | t6 |
| U001 | M01 | REGULAR TRANSMISSION (DURING BROWSING: NIGHTTIME MODE) | L3 | t7 |
| U001 | M01 | LOGOUT | | t8 |
| U001 | ... | ... | ... | ... |
| U001 | M02 | LOGIN | L2 | t11 |
| U001 | M02 | IMAGE BROWSING START | L2 | t12 |
| U001 | M02 | REGULAR TRANSMISSION (DURING BROWSING) | L2 | t13 |
| U001 | M02 | REGULAR TRANSMISSION (DURING BROWSING) | L2 | t14 |
| U001 | M02 | LOGOUT | | t15 |
| U001 | ... | ... | ... | ... |

FIG. 25

| USER ID | TERMINAL ID | CLASSIFICATION OF EVENT | TERMINAL SETTING VALUE | TIME |
|---|---|---|---|---|
| U001 | M01 | LOGIN | L1 | t1 |
| U001 | M01 | IMAGE BROWSING START | L1 | t2 |
| U001 | M01 | REGULAR TRANSMISSION (DURING BROWSING) | L1 | t3 |
| U001 | M01 | SLEEP ON | L1 | t4 |
| U001 | M01 | SLEEP OFF | L2 | t5 |
| U001 | M01 | REGULAR TRANSMISSION (DURING BROWSING: NIGHTTIME MODE) | L3 | t6 |
| U001 | M01 | REGULAR TRANSMISSION (DURING BROWSING: NIGHTTIME MODE) | L3 | t7 |
| U001 | M01 | LOGOUT | L3 | t8 |
| ... | ... | ... | ... | ... |
| U001 | M02 | LOGIN | L2 | t11 |
| U001 | M02 | IMAGE BROWSING START | L2 | t12 |
| U001 | M02 | REGULAR TRANSMISSION (DURING BROWSING) | L2 | t13 |
| U001 | M02 | REGULAR TRANSMISSION (DURING BROWSING) | L2 | t14 |
| U001 | M02 | LOGOUT | L2 | t15 |
| ... | ... | ... | ... | ... |
| U002 | M03 | LOGIN | L2 | t11 |
| U002 | M03 | IMAGE BROWSING START | L2 | t12 |
| U002 | M03 | REGULAR TRANSMISSION (DURING BROWSING) | L2 | t13 |
| U002 | M03 | REGULAR TRANSMISSION (DURING BROWSING) | L2 | t14 |
| U002 | M03 | LOGOUT | L2 | t15 |
| ... | ... | ... | ... | ... |

PRINT SUPPORT APPARATUS, METHOD OF OPERATING PRINT SUPPORT APPARATUS, AND OPERATION PROGRAM

CROSS-REFERENCE TO RELATED APPLICATIONS

The present application claims priority under 35 U.S.C. § 119 to Japanese Patent Application No. 2020-061595, filed on Mar. 30, 2020. The above application is hereby expressly incorporated by reference, in its entirety, into the present application.

BACKGROUND

1. Technical Field

A technique of the present disclosure relates to a print support apparatus, a method of operating a print support apparatus, and an operation program.

2. Description of the Related Art

In recent years, there are increasing cases where images captured with a terminal apparatus, such as a smartphone or a tablet terminal, are stored in a storage, and the images stored in the storage are browsed with various terminal apparatuses. Furthermore, there is an increase in an opportunity to print the images using a service, such as cloud print, after browsing the images with the terminal apparatus.

There is a case where images displayed on a display unit of the terminal apparatus in a case where the user browses the images with the terminal apparatus and images printed by a print apparatus are different in color, giving the user a sense of discomfort. For this reason, JP2015-070506A suggests that an image is subjected to color conversion such that a color of an image printed by a print apparatus is identical to a color of an image displayed on a display unit of a terminal apparatus. JP2015-070506A also suggests that an image is subjected to color conversion based on brightness set in the display unit of the terminal apparatus.

Furthermore, JP2007-295590A suggests that a display property in displaying an image is transmitted to a print apparatus and an image to be printed is corrected based on the display property.

SUMMARY

As described above, JP2015-070506A and JP2007-295590A suggest that an image (hereinafter, referred to as a print target image) to be printed by the print apparatus is corrected based on a setting value (hereinafter, referred to as a terminal setting value) regarding image display of the terminal apparatus.

Note that a user may browse images with a plurality of terminal apparatuses, and a terminal apparatus with which the user gives an instruction for image print may be different from a terminal apparatus that the user usually uses for image browsing. For example, there is a case where, while the user usually browses images with a smartphone, the user uses a personal computer in giving an instruction for image print.

A terminal setting value (brightness, color, or the like) may be different between the terminal apparatus that the user usually uses for image browsing and the terminal apparatus with which the user gives an instruction for image print. In such a case, in a case where the print target image is corrected based on the terminal setting value of the terminal apparatus with which the user gives an instruction for image print, a characteristic, such as brightness or color, of the print target image after correction is different from a characteristic of an image that the user usually browses, giving the user a sense of discomfort.

Even though the terminal apparatus that the user usually uses for image browsing is identical to the terminal apparatus with which the user gives an instruction for image print, the same problem may occur. This is because a terminal setting value that is used in a case where the user usually browses images is different from a terminal setting value that is used for print. For example, a case where high display brightness is set for image browsing and low display brightness is set in giving an instruction for print is considered. In such a case, the print target image is corrected to have brightness lower than brightness at which the user usually browses images, giving the user a sense of discomfort.

An object of the technique of the present disclosure is to provide a print support apparatus, a method of operating a print support apparatus, and an operation program that enable appropriate correction of a print target image according to an image browsing situation of a user.

To achieve the above-described object, the present disclosure provides a print support apparatus that receives a print target image selected in a terminal apparatus having a display unit, on which image browsing is possible, and instructs a printer to perform image print. The print support apparatus comprises at least one processor. The processor is configured to generate a terminal setting history by receiving and recording a terminal setting value, which is transmitted in a case where a specific event occurs and is involved in image browsing, from at least one terminal apparatus, specify the terminal setting value having a longest image browsing time as a reference setting value based on the terminal setting history, and correct a characteristic of the print target image based on the reference setting value.

It is preferable that the terminal setting value is a setting value of display brightness or color information of the display unit, and the processor is configured to correct brightness or a color of the print target image based on the reference setting value.

It is preferable that the terminal setting value is transmitted as the specific event from the terminal apparatus each time a given time elapses within an image browsing period of the terminal apparatus.

It is preferable that the processor is configured to integrate an image browsing time for each terminal setting value included in the terminal setting history and specify the terminal setting value having a longest integrated time as the reference setting value.

It is preferable that the processor is configured to specify, as the reference setting value, a terminal setting value after conversion obtained by converting the terminal setting value included in the terminal setting history based on a conversion table for converting a difference in terminal setting value among a plurality of the terminal apparatuses.

It is preferable that the processor is configured to record terminal setting information including the terminal setting value transmitted from the terminal apparatus in the terminal setting history.

It is preferable that the terminal setting information includes identification information of a user, identification information of the terminal apparatus, a classification of the event, and a time when the terminal setting value is acquired, in addition to the terminal setting value.

It is preferable that the processor is configured to delete the terminal setting information with a given elapsed time or more after recording the terminal setting information in the terminal setting history based on the time.

It is preferable that the processor is configured to extract the terminal setting history corresponding to identification information of the user of the terminal apparatus where the print target image is selected, and specify the reference setting value based on the extracted terminal setting history.

It is preferable that the processor is configured to correct the characteristic of the print target image based on a correction value corresponding to a difference between the reference setting value and the terminal setting value of the terminal apparatus where the print target image is selected.

It is preferable that the processor is configured to notify of a warning in a case where the reference setting value and the terminal setting value of the terminal apparatus where the print target image is selected are different by a given value or more.

The present disclosure provides a method of operating a print support apparatus that receives a print target image selected in a terminal apparatus having a display unit, on which image browsing is possible, and instructs a printer to perform image print. The method comprises generating a terminal setting history by receiving and recording a terminal setting value, which is transmitted in a case where a specific event occurs and is involved in image browsing, from at least one terminal apparatus, specifying the terminal setting value having a longest image browsing time as a reference setting value based on the terminal setting history, and correcting a characteristic of the print target image based on the reference setting value.

The present disclosure provides an operation program causing a computer to execute processing of receiving a print target image selected in a terminal apparatus having a display unit, on which image browsing is possible, and instructing a printer to perform image print, and processing of generating a terminal setting history by receiving and recording a terminal setting value, which is transmitted in a case where a specific event occurs and is involved in image browsing, from at least one terminal apparatus, specifying the terminal setting value having a longest image browsing time as a reference setting value based on the terminal setting history, and correcting a characteristic of the print target image based on the reference setting value.

According to the technique of the present disclosure, it is possible to provide a print support apparatus, a method of operating a print support apparatus, and an operation program that enable appropriate correction of a print target image according to an image browsing situation of a user.

BRIEF DESCRIPTION OF THE DRAWINGS

Exemplary embodiments according to the technique of the present disclosure will be described in detail based on the following figures, wherein:

FIG. 13 is a diagram showing an example of a correction method of an image, FIG. 14 is a diagram showing an example of a terminal setting history, FIG. 25 is a diagram showing an example of a table that records terminal setting information to a plurality of user IDs.

DETAILED DESCRIPTION

First Embodiment

Figure 1:
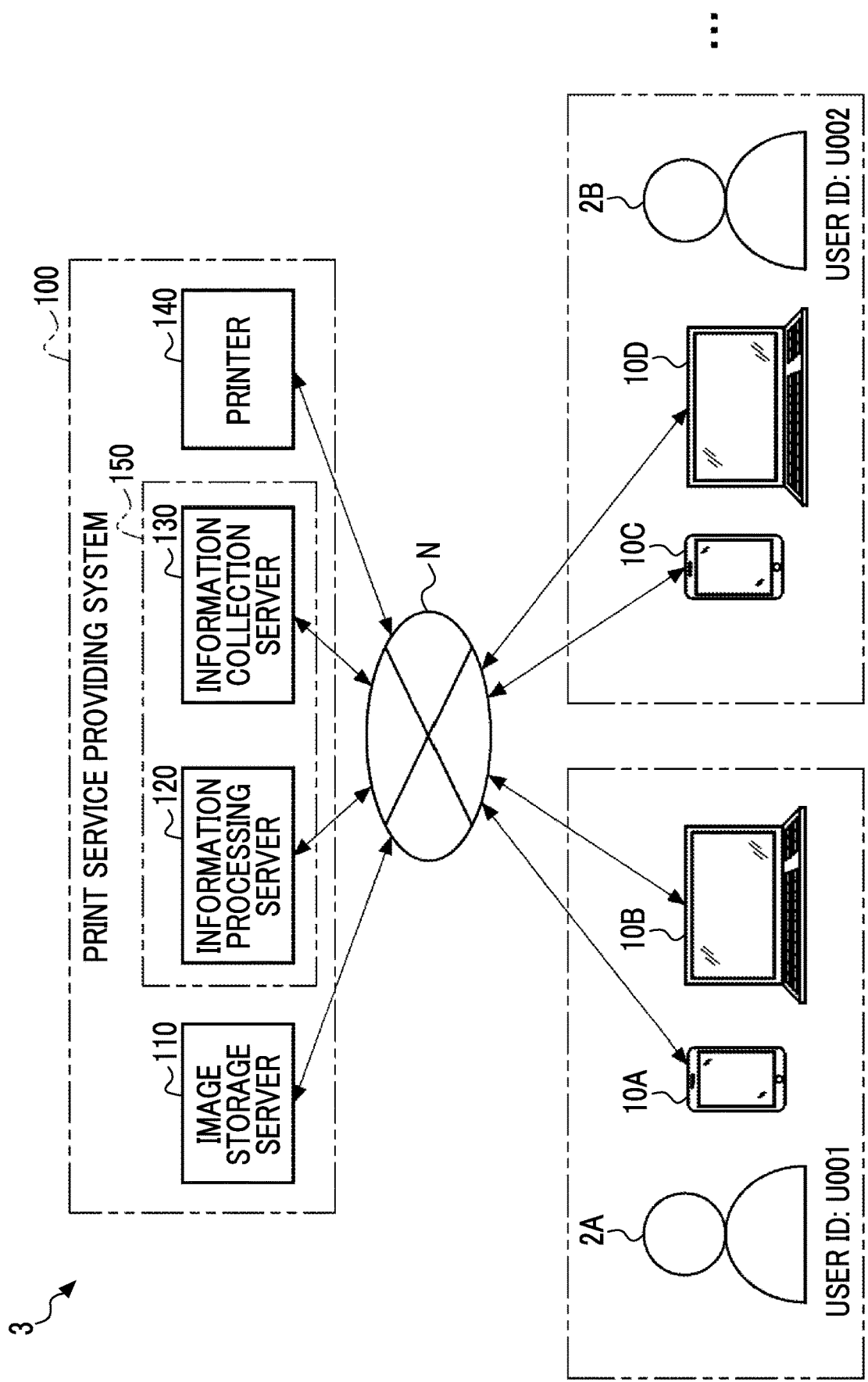
FIG. 1 is a diagram showing a configuration example of a print system according to a first embodiment.

FIG. 1 is a diagram showing a configuration example of a print system according to a first embodiment of the present disclosure. A print system 3 includes a print service providing system, and at least one terminal apparatus that enables image browsing.

A print service providing system 100 includes an image storage server 110, an information processing server 120, an information collection server 130, and a printer 140. The image storage server 110, the information processing server 120, the information collection server 130, and the printer 140 can perform communication with one another through a network N. The network N is, for example, at least one of a wide area network (WAN), such as the Internet or a public communication network, or a local area network (LAN), such as Wi-Fi (Registered Trademark). Connection of each server or the printer 140 and the network N is performed by at least one of a wired system or a wireless system.

The information processing server 120 and the information collection server 130 configure a print support apparatus 150 and provide a so-called print service for a user. The print service is a service that receives a print order from the terminal apparatus 10 through the network N. The image storage server 110 provides a so-called storage service for the user. Furthermore, the storage service is a service that receives storage of data, such as images, acquired from the terminal apparatus 10 through the network N. Note that the print service and the storage service may be, for example, a cloud service that performs transmission and reception of data online.

Terminal apparatuses 10A, 10B, 10C, 10D, . . . that use at least one of the print service or the storage service are connected to the network N. Hereinafter, the terminal apparatuses 10A, 10B, 10C, 10D, . . . are simply denoted as a "terminal apparatus 10" in a case of indicating any terminal apparatus without need for distinction.

The image storage server 110, the information processing server 120, the information collection server 130, and the printer 140 are managed by, for example, the same service provider. Note that the image storage server 110 and the printer 140 may be managed by a service provider different from a service provider of the print support apparatus 150.

The terminal apparatus 10 is a general-purpose terminal apparatus, such as a smartphone, a tablet terminal, a personal computer (PC), or an imaging apparatus. The imaging apparatus is, for example, a digital camera. Each terminal apparatus 10 is given a unique terminal identification (ID) as identification information.

An application program (hereinafter, referred to as an application) corresponding to the print service providing system 100 is installed on the terminal apparatus 10. The user can store images captured with the terminal apparatus 10 in the image storage server 110 and can suitably browse the images using the application installed on the terminal apparatus 10. Furthermore, the user can print the images being browsed with the application using the printer 140.

In the embodiment, as shown in FIG. 1, it is assumed that the terminal apparatuses 10A and 10B are owned by a user 2A, and the terminal apparatuses 10C and 10D are owned by a user 2B. Hereinafter, the users 2A and 2B are simply denoted as a "user 2" in a case of indicating any user without need for distinction.

Furthermore, each user 2 is allocated with an account for using a service using the application of the terminal apparatus 10 from the print service providing system 100. Each user 2 can use the storage service and the print service by logging in to the print service providing system 100 using a user ID and a password set in advance using the application. In the embodiment, it is assumed that "U001" is set as the user ID to the user 2A, and "U002" is set as the user ID to the user 2B.

The image storage server 110 classifies and stores images for each user ID, and provides images associated with the user ID according to a request from the terminal apparatus 10. The information collection server 130 collects terminal setting information of a plurality of terminal apparatuses 10 to be used by the user 2 for each user ID. The terminal setting information is information including a setting value (terminal setting value) of a display unit 304 (see FIG. 3) of the terminal apparatus 10. The terminal setting value is a setting value that is involved in image browsing. In the embodiment, the terminal setting value is a setting value of display brightness of the display unit 304.

The display brightness has no relationship with a brightness value of an image, and is a value corresponding to a light emission amount of a light source included in the display unit 304. For example, the display brightness corresponds to brightness of a screen of the display unit 304 in a case where a white image is displayed. Furthermore, for example, in a case where the display unit 304 is configured of a liquid crystal display (LCD), the display brightness corresponds to a setting value of brightness of a backlight.

In regard to an image to be printed (hereinafter, referred to as a print target image) transmitted from the terminal apparatus 10, the information processing server 120 specifies a terminal setting value having a longest image browsing time among a plurality of terminal setting values based on a history (hereinafter, referred to as a terminal setting history) of the terminal setting information collected by the information collection server 130 and sets the specified terminal setting value as a reference setting value. Furthermore, the information processing server 120 corrects a characteristic of the print target image based on the reference setting value and transmits the image after correction as print data to the printer 140.

The printer 140 is a print apparatus that prints an image on a recording medium, such as photo paper, based on print data. The printer 140 prints an image on the recording medium based on the print data transmitted from the information processing server 120. The medium on which the image is printed is provided to the user 2 by a method, such as delivery.

Hereinafter, the configuration of each unit of the print service providing system 100 will be described in detail.

Figure 2:
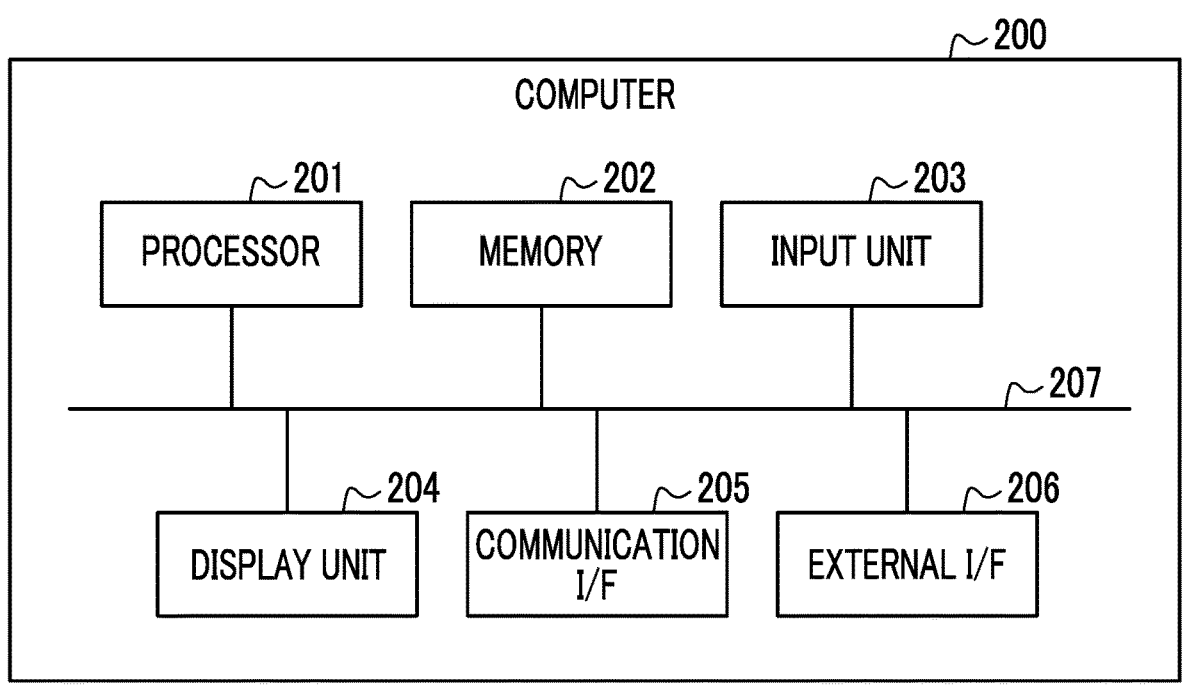
FIG. 2 is a diagram showing an example of the hardware configuration of a computer.

Each of the image storage server 110, the information processing server 120, and the information collection server 130 is configured of a computer. FIG. 2 is a diagram showing an example of the hardware configuration of the computer. The computer 200 has, for example, a processor 201, a memory 202, an input unit 203, a display unit 204, a communication interface (I/F) 205, an external I/F 206, and a bus 207.

The processor 201 is an arithmetic apparatus that realizes each function of the computer 200 by reading an operation program and data stored in the memory 202 and executing processing. The processor 201 is, for example, a central processing unit (CPU).

The memory 202 is a storage apparatus that stores an operation program or data in a case where the processor 201 executes processing. The memory 202 includes, for example, a random access memory (RAM), a read only memory (ROM), and a storage. The RAM is, for example, a volatile memory that is used as a work area or the like of the processor 201. The ROM is, for example, a nonvolatile memory that holds the operation program and data. The ROM is, for example, a flash memory. The storage is a large capacity storage apparatus, such as a hard disk drive (HDD) or a solid state drive (SSD), and stores an operating system (OS), an application, various kinds of data, and the like. Note that the memory 202 may be configured as external equipment that is connected to the computer 200 through the communication I/F 205 or the external I/F 206 described below.

The input unit 203 is an input device, such as a pointing device including a mouse, a keyboard, or a touch panel that receives an input by a touch operation. The input unit 203 is used for inputting each operation signal to the computer 200. Note that the input unit 203 may include a microphone or the like and may receive a voice input through the microphone or the like. Furthermore, the input unit 203 may include various sensors and may receive an input by a gesture operation of the user 2 with various sensors. The display unit 204 is a display device, such as a display, and displays a processing result or the like of the computer 200. Note that the input unit 203 and the display unit 204 may be integrally formed like a display incorporating a touch panel.

The communication I/F 205 is a communication interface for connecting the computer 200 to the network N. The external I/F 206 is an interface for connecting the computer 200 to an external apparatus. The external I/F 206 is, for example, an interface for connecting an external apparatus, such as a storage medium including a universal serial bus (USB) memory, to the computer 200. The bus 207 is connected to each unit described above and transmits address signals, data signals, various control signals, and the like.

Figure 3:
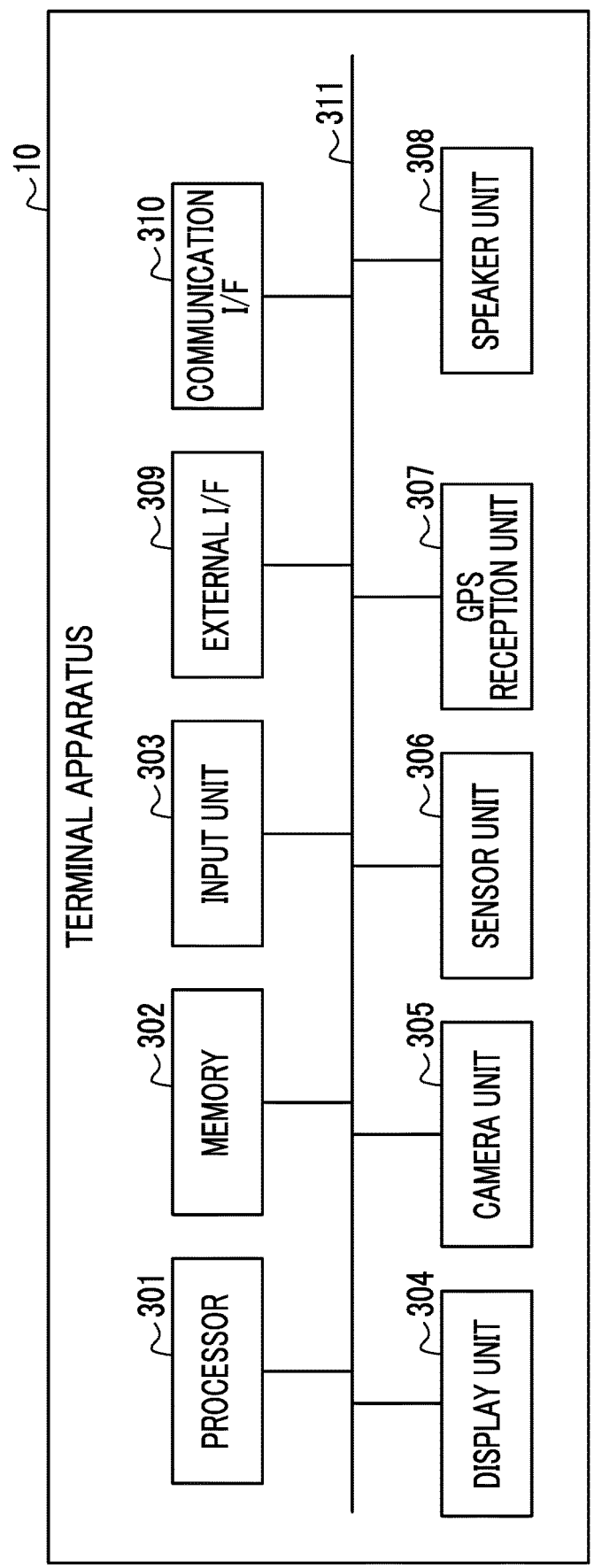
FIG. 3 is a diagram showing an example of the hardware configuration of a terminal apparatus.

FIG. 3 is a diagram showing an example of the hardware configuration of the terminal apparatus 10. The terminal apparatus 10 includes the configuration of a general computer. The terminal apparatus 10 has, for example, a processor 301, a memory 302, an input unit 303, a display unit 304, a camera unit 305, a sensor unit 306, a global positioning system (GPS) reception unit 307, a speaker unit 308, an external I/F 309, a communication I/F 310, and a bus 311.

The processor 301 is an arithmetic apparatus that realizes each function of the terminal apparatus 10 by reading an operation program and data stored in the memory 302 and executing processing. The processor 301 is, for example, a CPU.

The memory 302 is a storage apparatus that stores an operation program or data in a case where the processor 201 executes processing. The memory 302 includes, for example, a RAM, a ROM, and a storage. The RAM is, for example, a volatile memory that is used as a work area or the like of the processor 301. The ROM is, for example, a nonvolatile memory that holds the operation program and data. The ROM is, for example, a flash memory. The storage is, for example, a storage apparatus, such as an HDD, an SSD, or a flash memory. The storage stores an OS, an application, image data, various kinds of data, and the like. Note that the memory 302 may be configured as external equipment that is connected to the terminal apparatus 10 through the communication I/F 310 or the external I/F 309 described below.

The input unit 303 is an input device, such as a pointing device including a mouse, a keyboard, and a touch panel that receives an input by a touch operation. The input unit 303 is used for inputting each operation signal to the computer 200. Note that the input unit 303 may include a microphone or the like and may receive a voice input through the microphone or the like. Furthermore, the input unit 303 may receive an input by a gesture operation of the user 2 with the sensor unit 306 described below. The display unit 304 is a display device, such as a display, and displays a processing result or the like of the terminal apparatus 10. Note that the input unit 303 and the display unit 304 may be a display and input device having an input function and a display function, such as a touch panel display. The display and input device is an LCD or an organic electroluminescent (EL) display incorporating a touch panel sensor. The camera unit 305 is an imaging apparatus including an imaging element, an image processing device, and the like.

The sensor unit 306 is a measurement apparatus that measures motion of the terminal apparatus 10. The sensor unit 306 includes, for example, a sensor, such as an acceleration sensor or a gyro sensor. The GPS reception unit 307 is a positional information acquisition device that receives positioning signals transmitted from GPS satellites and outputs positional information. The speaker unit 308 is a voice circuit that generates a voice signal, and a voice output apparatus that converts the voice signal into voice and outputs voice.

The communication I/F 310 is a communication interface for connecting the terminal apparatus 10 to the network N. The communication I/F 310 is, for example, a wireless communication unit that connects the terminal apparatus 10 to the network N through a mobile communication network, such as Long Term Evolution (LTE), and includes an antenna, a wireless transmission and reception circuit, a communication control circuit, and the like. The communication I/F 310 performs communication with the image storage server 110, the information processing server 120, the information collection server 130, and the like. The external I/F 309 is an interface for connecting an external apparatus, such as a storage medium including a USB memory, to the terminal apparatus 10. The bus 311 is connected to each configuration described above, and transmits address signals, data signals, various control signals, and the like.

Note that the terminal apparatus 10 is not limited to the configuration shown in FIG. 3, and may be a personal computer configured of the computer 200 shown in FIG. 2.

Figure 4:
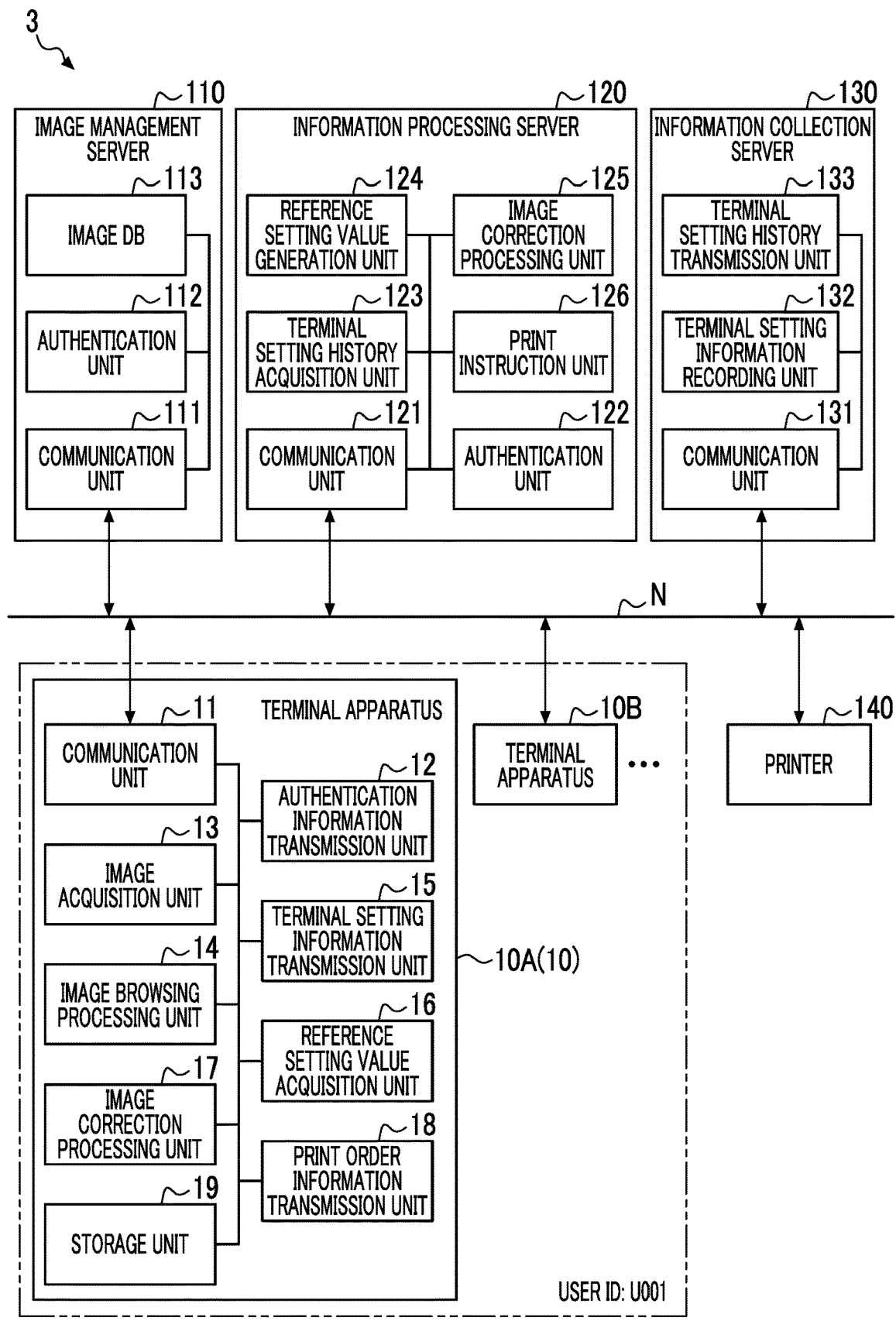
FIG. 4 is a diagram showing an example of the functional configuration of the print system.

FIG. 4 is a diagram showing an example of the functional configuration of the print system 3. The terminal apparatus 10 realizes various functions by executing a specified operation program and an application with the processor 301 (see FIG. 3). Various functions may be realized by hardware.

The terminal apparatus 10 has a communication unit 11, an authentication information transmission unit 12, an image acquisition unit 13, an image browsing processing unit 14, a terminal setting information transmission unit 15, a reference setting value acquisition unit 16, an image correction processing unit 17, a print order information transmission unit 18, a storage unit 19, and the like.

The communication unit 11 connects the terminal apparatus 10 to the network N, for example, using the communication I/F 310 (see FIG. 3) and performs communication with the image storage server 110, the information processing server 120, the information collection server 130, and the like.

Figure 5:
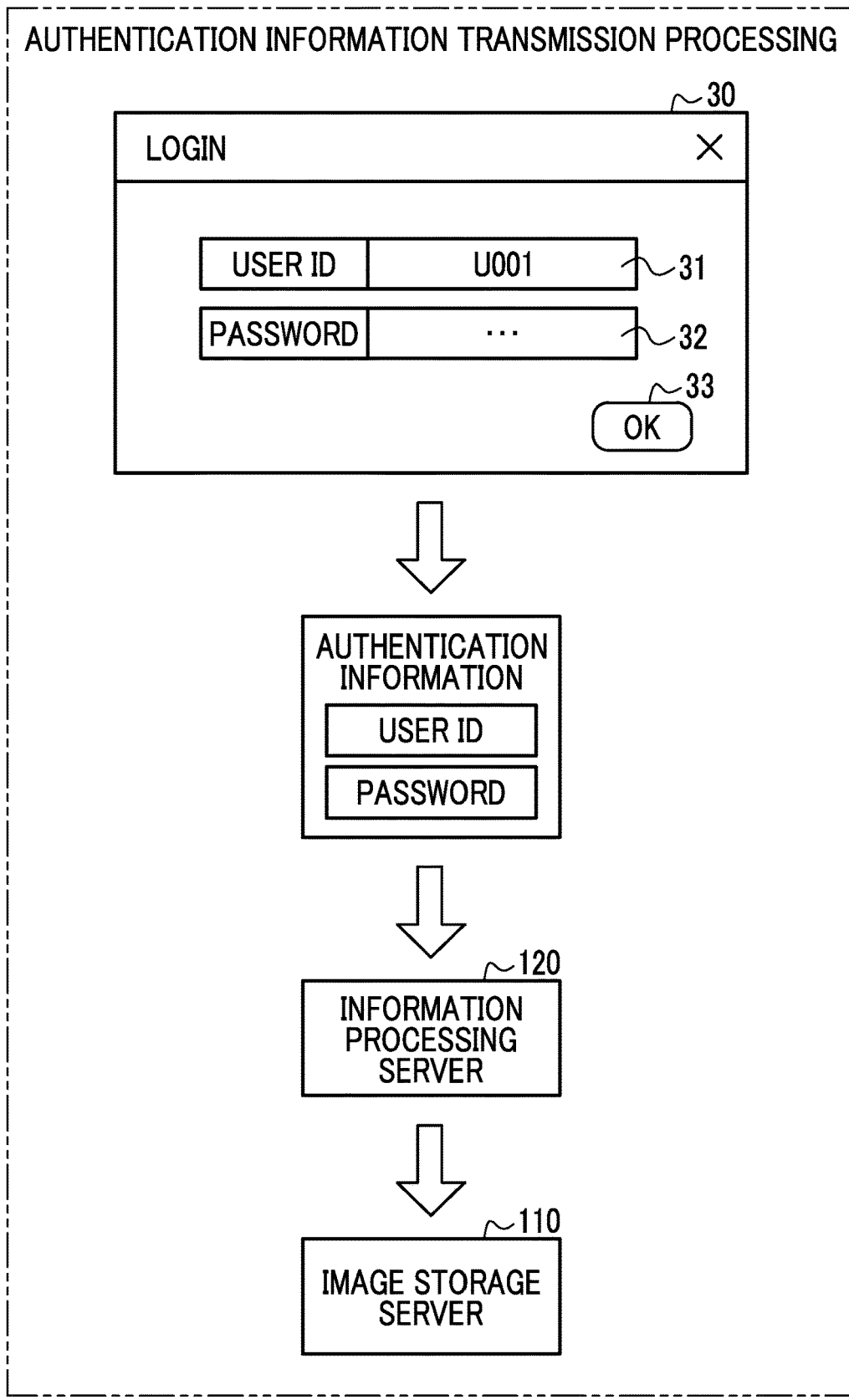
FIG. 5 is a diagram illustrating an example of authentication information transmission processing.

The authentication information transmission unit 12 transmits authentication information of a user for using the print service providing system 100 to the information processing server 120 through the communication unit 11. The authentication information includes a user ID and a password. The authentication information is generated by the user 2 inputting the user ID and the password on a login screen 30 shown in FIG. 5. The login screen 30 is displayed on the display unit 304 (see FIG. 3) of the terminal apparatus 10. The login screen 30 is provided with a first input box 31 for inputting the user ID, a second input box 32 for inputting the password, and an OK button 33 by the display unit 304 and the input unit 303 of the terminal apparatus 10.

The authentication information transmission unit 12 generates the authentication information by the input unit 303 of the terminal apparatus 10 in a case where the OK button 33 is depressed after the user 2 inputs the user ID to the first input box 31 and inputs the password to the second input box 32, and transmits the authentication information to the information processing server 120. The information processing server 120 performs authentication using the received authentication information, and then, transmits the authentication information to the image storage server 110. In a case where authentication is successfully performed using the information processing server 120 and the image storage server 110, the login to the print service providing system 100 is completed.

Note that, in a case where there a plurality of image storage servers 110, the authentication information transmission unit 12 may transmit specification information (for example, a uniform resource locator (URL)) for specifying one image storage server 110 selected by the user 2 to the information processing server 120 along with the authentication information.

Figure 6:
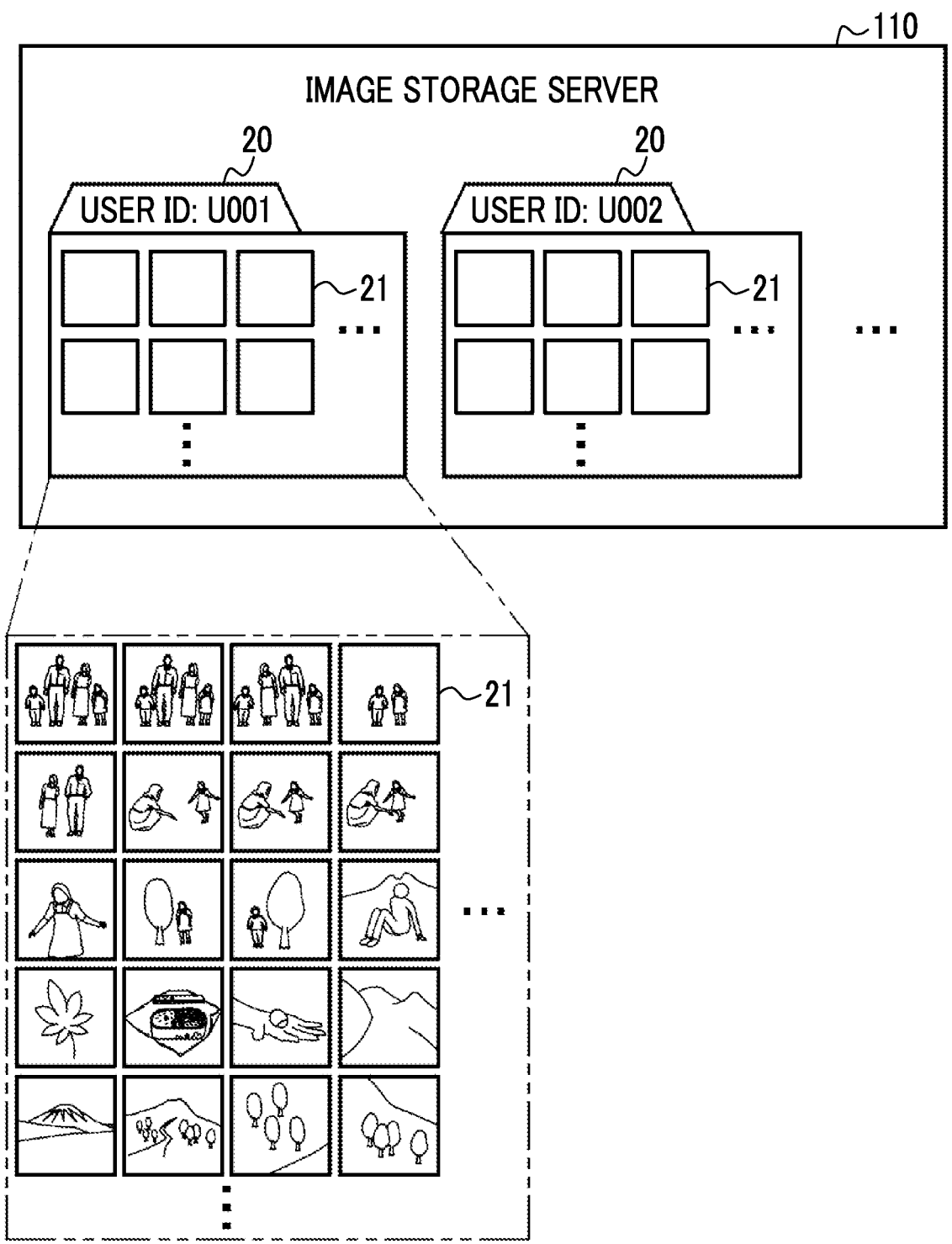
FIG. 6 is a diagram showing a file configuration example of an image management server.

The image acquisition unit 13 acquires images associated with the user ID from the image storage server 110 through the communication unit 11. As shown in FIG. 6, the image storage server 110 is provided with a folder 20 for each user ID, and a plurality of images 21 are stored in the folder 20. The image storage server 110 transmits all or a part of images 21 in the folder 20 corresponding to the user ID of the user 2 as a request source to the image acquisition unit 13 according to a request from the image acquisition unit 13. The image acquisition unit 13 acquires the images 21 transmitted from the image storage server 110 through the communication unit 11 and stores the images 21 in the storage unit 19.

Figure 7:
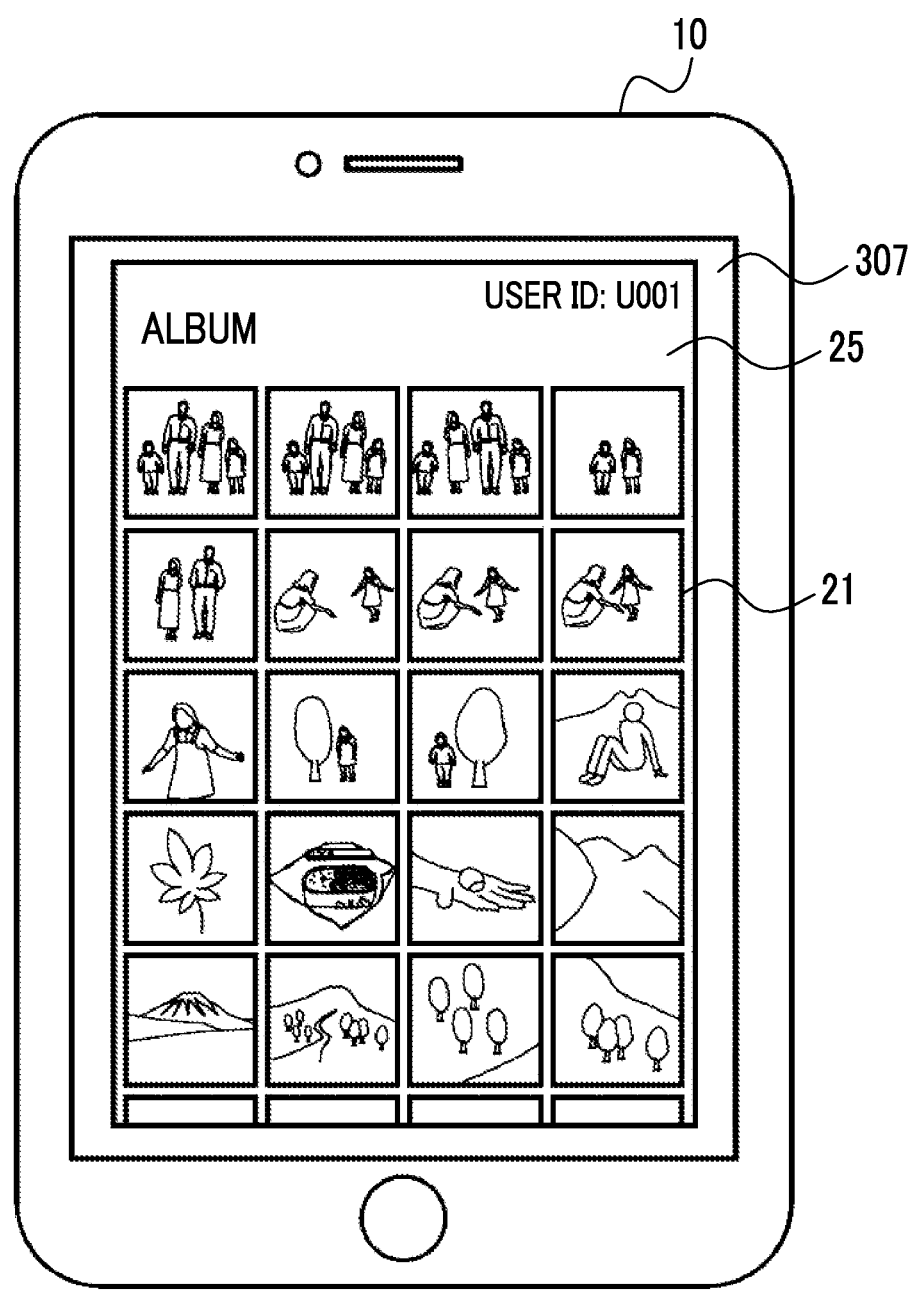
FIG. 7 is a diagram showing an example of an image browsing screen.

The image browsing processing unit 14 performs image browsing processing for making the user 2 browse the images 21 stored in the storage unit 19. For example, as shown in FIG. 7, the image browsing processing unit 14 displays an image browsing screen 25 on the display unit 304 of the terminal apparatus 10. The user 2 can perform enlarged display, image edition, deletion, or the like of a desired image 21 through a touch operation on the image browsing screen 25.

Furthermore, the user 2 can transmit an image acquired by imaging with the camera unit 305 of the terminal apparatus 10 to the image storage server 110 to add the image into the folder 20 through a touch operation on the image browsing screen 25.

Figures 8, 9:
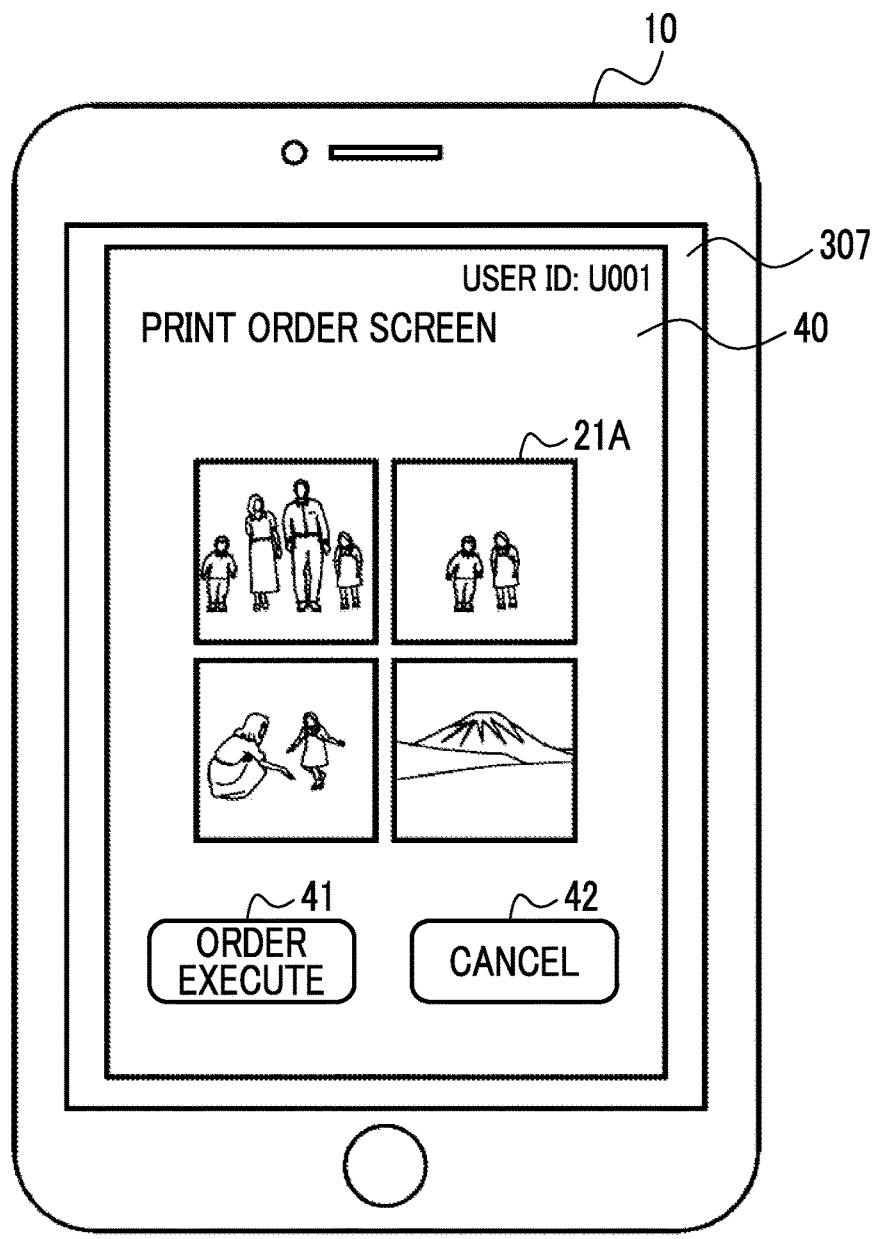
FIG. 8 is a diagram showing an example of a print order screen.
FIG. 9 is a diagram showing an example of terminal setting information.

In addition, the image browsing screen 25 is also used for a print order operation in a case where the image 21 desired by the user 2 is printed using the printer 140. For example, as shown in FIG. 8, the image browsing processing unit 14 displays a print order screen 40 on the display unit 304 of the terminal apparatus 10. On the print order screen 40, one or more print target images 21A selected by the user 2 are displayed. The print target image 21A is an image selected as a print target from a plurality of images 21 displayed within the image browsing screen 25 shown in FIG. 7.

The print order screen 40 is provided with an order execute button 41 and a cancel button 42. The user 2 can execute a print order of the image 21A displayed on the print order screen 40 by depressing the order execute button 41. Furthermore, the user 2 can cancel a print order by depressing the cancel button 42.

The terminal setting information transmission unit 15 acquires the terminal setting information of the terminal apparatus 10 while the user 2 browses the images 21 and transmits the acquired terminal setting information to the information collection server 130 through the communication unit 11. As described above, the terminal setting value is the setting value of the display brightness of the display unit 304. The terminal setting information transmission unit 15 acquires and transmits the terminal setting information in a case where a specific event, such as image browsing start or a lapse of a given time, occurs.

Specifically, the terminal setting information transmission unit 15 generates terminal setting information including a user ID, a terminal ID, a classification of an event, and a time, in addition to the terminal setting value, and transmits the terminal setting information to the information collection server 130. Terminal setting information RI shown in FIG. 9 is an example of terminal setting information that is acquired in the image browsing start. The information collection server 130 accumulates the terminal setting information transmitted from the terminal setting information transmission unit 15 for each user ID to generate the terminal setting history.

The user 2 can change the setting of the display brightness through a touch operation on the input unit 303. The setting of the display brightness of the display unit 304 is executed by, for example, the function of the OS of the terminal apparatus 10. The terminal setting information transmission unit 15 acquires the terminal setting value (display brightness), for example, through an application programming interface (API) using the function of the OS.

Figure 10:
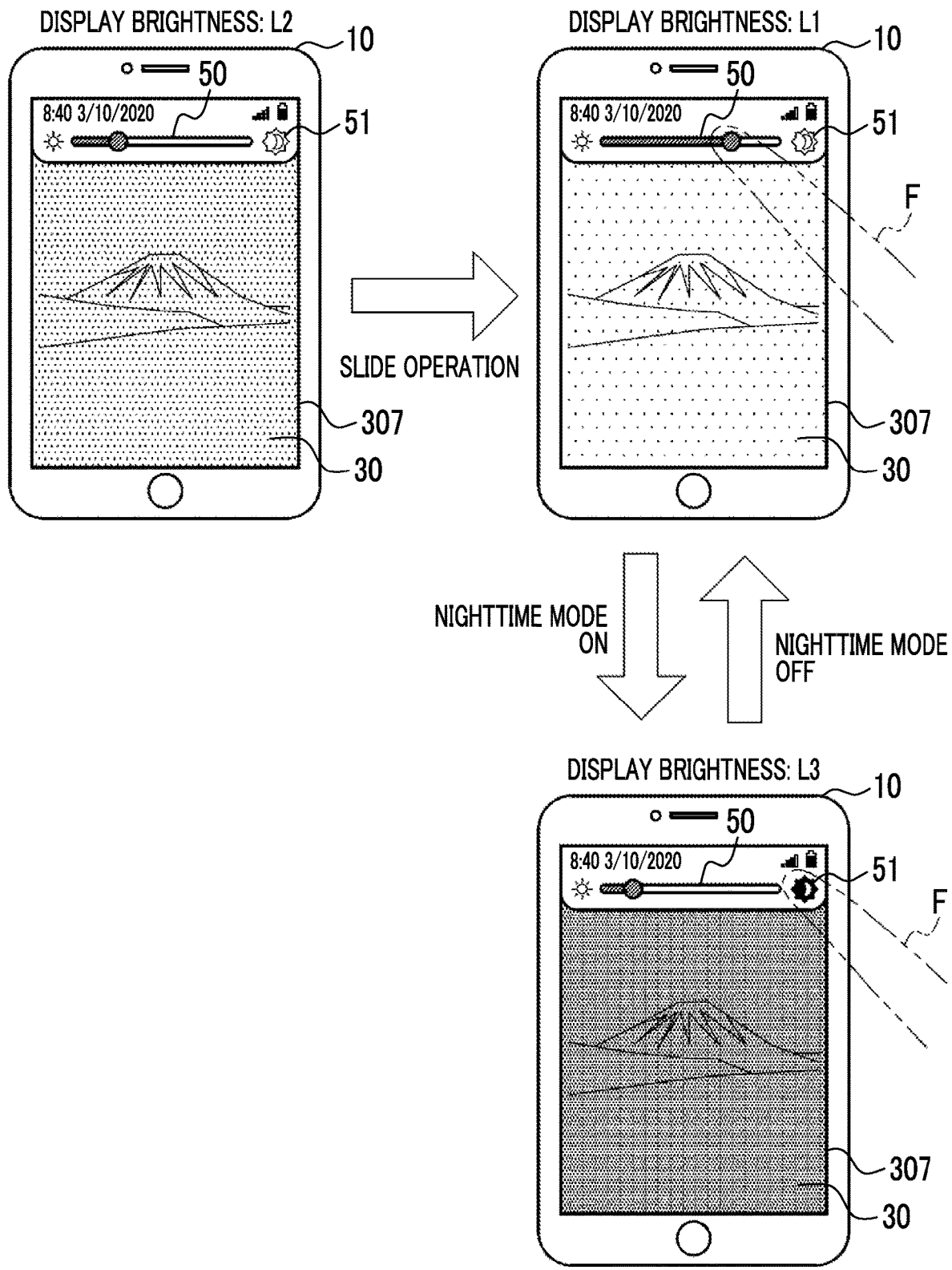
FIG. 10 is a diagram showing an example of a setting change method of display brightness.

FIG. 10 is a diagram showing an example of a setting change method of the display brightness. On the display unit 304, a slide bar 50 for adjusting the display brightness and a nighttime mode set button 51 for performing an on or off operation of a nighttime mode are displayed according to a touch operation of the user 2 on the input unit 303. The user 2 can change the display brightness through a slide operation of the slide bar 50 with respect to the input unit 303 with a finger F. FIG. 10 shows an example where the display brightness is changed from L2 to L1 through a slide operation of the slide bar 50. Note that an operation to adjust the display brightness is not limited to a slide operation, an increase button for increasing the display brightness and a decrease button for decreasing the display brightness may be displayed and the display brightness may be changed according to the number of operations or an operation time of the increase button or the decrease button.

Furthermore, the user 2 can reduce the display brightness to a specified value by depressing the nighttime mode set button 51 with the finger F. In addition, the user 2 can return the display brightness to a value before the setting of the nighttime mode by depressing the nighttime mode set button 51 with the finger F again and releasing the nighttime mode. FIG. 10 shows an example where the display brightness is changed from L1 to L3 with the setting of the nighttime mode, and the display brightness is returned from L3 to L1 with the release of the nighttime mode.

Figure 11:
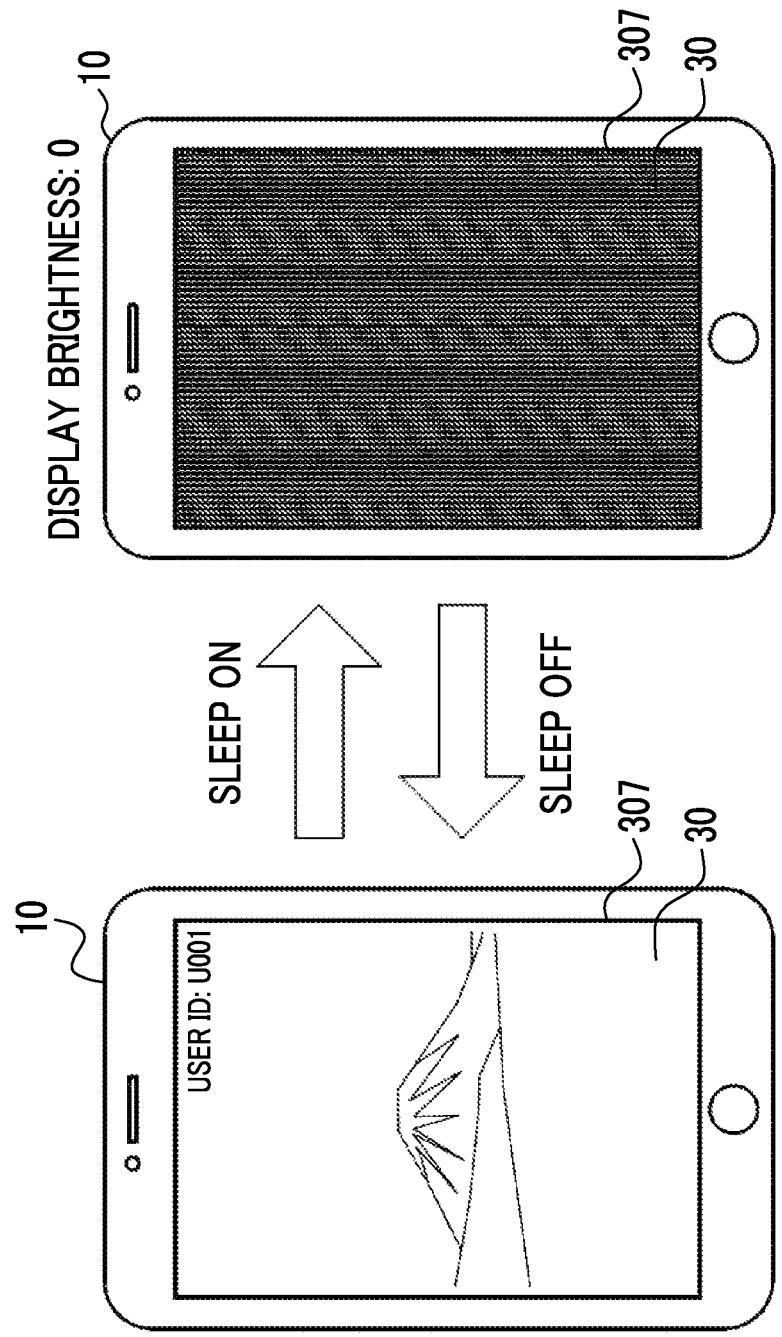
FIG. 11 is a diagram showing an example where display brightness is changed according to on or off of a sleep mode.

FIG. 11 is a diagram showing an example where the display brightness is changed with on or off of a sleep mode. The sleep mode is a mode in which the operation of the processor 301 is brought into a sleep state to achieve low power consumption in a case where the terminal apparatus 10 is not operated for a given time. As shown in FIG. 11, in a case where the terminal apparatus 10 transits to the sleep mode (sleep on), the display brightness of the display unit 304 is "0". In a case where the terminal apparatus 10 is operated and the sleep mode is released (sleep off), the display brightness is returned to a value before the transition to the sleep mode.

In this way, as the user 2 starts to browse the images on the image browsing screen 25, and then, the user 2 changes the setting (see FIG. 10), the terminal apparatus 10 transits to the sleep mode (see FIG. 11), or the like, the display brightness of the display unit 304 is changed. The terminal setting information transmission unit 15 transmits the terminal setting information including the terminal setting value (display brightness) set in a case where the event occurs, to the information collection server 130.

Figure 12:
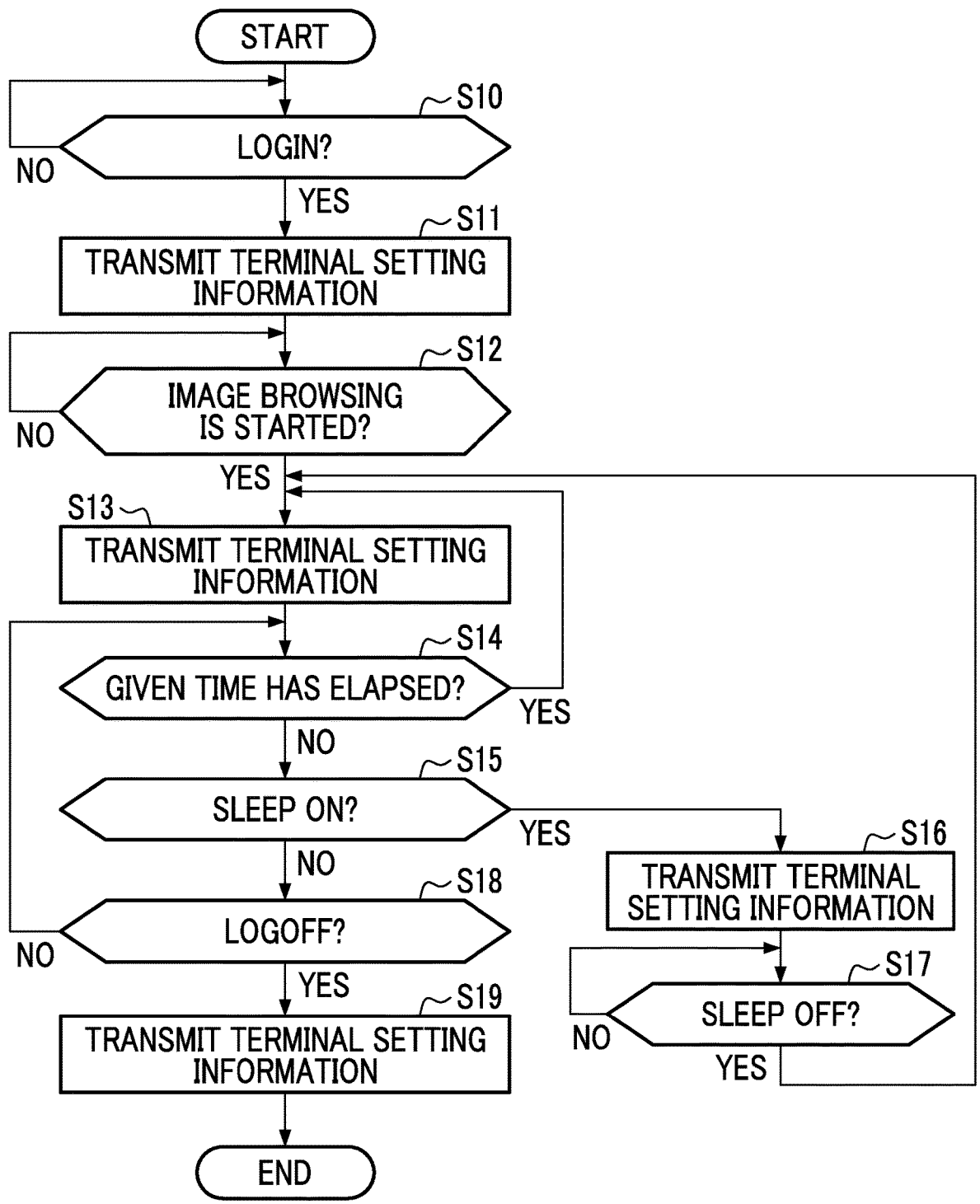
FIG. 12 is a flowchart showing an example of a transmission timing of terminal setting information.

FIG. 12 is a flowchart showing an example of a transmission timing of the terminal setting information by the terminal setting information transmission unit 15. First, the terminal setting information transmission unit 15 repeatedly determines whether or not login is performed to the print service providing system 100 through an operation on the login screen 30 (see FIG. 5) (Step S10). In a case where determination is made that the login is performed (Step S10: YES), the terminal setting information transmission unit 15 transmits the terminal setting information (see FIG. 9) at a time, at which the determination is made, to the information collection server 130 (Step S11).

Next, the terminal setting information transmission unit 15 repeatedly determines whether or not image browsing is started with the image browsing screen 25 (Step S12). For example, the terminal setting information transmission unit 15 determines that image browsing is started, as shown in FIG. 7, in a case where the images acquired from the image storage server 110 are displayed on the image browsing screen 25. In a case where determination is made that image browsing is started (Step S12: YES), the terminal setting information transmission unit 15 transmits the terminal setting information at a time, at which the determination is made, to the information collection server 130 (Step S13).

Next, the terminal setting information transmission unit 15 determines whether or not a given time has elapsed after the terminal setting information is transmitted in Step S13 (Step S14). In a case where determination is made that the given time has elapsed (Step S14: YES), the terminal setting information transmission unit 15 returns the process to Step S13, and transmits the terminal setting information to the information collection server 130.

In a case where determination is made that the given time has not elapsed (Step S14: NO), the terminal setting information transmission unit 15 determines whether or not the terminal apparatus 10 transits to the sleep mode (sleep on) (Step S15). In a case where determination is made that the terminal apparatus 10 transits to the sleep mode (Step S15: YES), the terminal setting information transmission unit 15 transmits the terminal setting information at a time, at which the determination is made, to the information collection server 130 (Step S16).

Thereafter, the terminal setting information transmission unit 15 repeatedly determines whether or not the terminal apparatus 10 is released from the sleep mode (sleep off) (Step S17). In a case where determination is made that the terminal apparatus 10 is released from the sleep mode (Step S17: YES), the terminal setting information transmission unit 15 returns the process to Step S13, and transmits the terminal setting information to the information collection server 130.

In a case where determination is made in Step S15 that the terminal apparatus 10 does not transit to the sleep mode (Step S15: NO), the terminal setting information transmission unit 15 determines whether or not a logoff operation from the print service providing system 100 is performed (Step S18). In a case where determination is made that the logoff operation is not performed (Step S18: NO), the terminal setting information transmission unit 15 returns the process to Step S14. In a case where determination is made that the logoff operation is performed (Step S18: YES), the terminal setting information transmission unit 15 transmits the terminal setting information at a time, at which the determination is made, to the information collection server 130 (Step S19). In a case where the processing of Step S19 is completed, the terminal setting information transmission unit 15 ends a series of processing.

As above, in the example shown in FIG. 12, the terminal setting information transmission unit 15 transmits the terminal setting information in a case where login, image browsing start, a lapse of a given time, sleep on, sleep off, and logoff occurs as an event. Note that the timing at which the terminal setting information transmission unit 15 transmits the terminal setting information is not limited to the timing shown in FIG. 12 at which the event occurs.

Returning to FIG. 4, the reference setting value acquisition unit 16 of the terminal apparatus 10 acquires a reference setting value from the information processing server 120. Details of the reference setting value will be described below.

The image correction processing unit 17 corrects the characteristic of the image selected as a print target on the image browsing screen 25 based on the reference setting value acquired by the reference setting value acquisition unit 16 and a current terminal setting value of the terminal apparatus 10. Specifically, the image correction processing unit 17 corrects the characteristic of the image selected as a print target according to a difference between the reference setting value and the current terminal setting value.

In the embodiment, the image correction processing unit 17 corrects the brightness value of the image. For example, it is assumed that actual brightness of the screen of the display unit 304 on which the print target image is displayed is proportional to a product of the terminal setting value (display brightness) and brightness of the print target image. In this case, as shown in FIG. 13, the image correction processing unit 17 corrects the brightness of the print target image such that the actual brightness of the screen in a case where display is performed with the current terminal setting value (for example, L2) coincides with the actual brightness of the screen in a case where display is performed with the reference setting value (for example, L1). With this, the print target image 21A of which the brightness is corrected to be close to the brightness of the screen, on which the user 2 usually browses, is displayed as a preview on the print order screen 40 shown in FIG. 8.

The print order information transmission unit 18 transmits print order information to the information processing server 120 as the user 2 performs an order instruction by depressing the order execute button 41 on the print order screen 40. For example, the print order information includes the print target image, the reference setting value, and a correction value (see FIG. 13) of the image. Here, the print target image included in the print order information is an image before correction based on the reference setting value is performed by the image correction processing unit 17. Note that, in a case where image edition is performed on the image browsing screen 25, the print target image included in the print order information is an image after image edition.

Next, in FIG. 4, the image storage server 110, the information processing server 120, and the information collection server 130 realize various functions by executing a specified operation program with the processor 201 (see FIG. 2). Various functions may be realized by hardware, such as dedicated circuits.

The image storage server 110 has a communication unit 111, an authentication unit 112, an image database (DB) 113, and the like. The communication unit 111 connects the image storage server 110 to the network N using the communication I/F 205 and performs communication with the information processing server 120, the terminal apparatus 10, and the like.

The authentication unit 112 receives the authentication information transmitted from the information processing server 120 through the communication unit 111 and executes authentication processing of the user 2. Furthermore, the authentication unit 112 transmits an authentication result to the information processing server 120 through the communication unit 111. In the image DB 113, images are stored in association with the user ID (see FIG. 6).

The information collection server 130 has a communication unit 131, a terminal setting information recording unit 132, a terminal setting history transmission unit 133. The communication unit 131 connects the information collection server 130 to the network N using the communication I/F 205 and performs communication with the information processing server 120, the terminal apparatus 10, and the like.

The terminal setting information recording unit 132 receives the terminal setting information, which is transmitted from the terminal setting information transmission unit 15 of the terminal apparatus 10, through the communication unit 131. As shown in FIG. 14, the terminal setting information recording unit 132 accumulates the received terminal setting information and records the terminal setting information in a form of a table for each user ID. A table TS1 represents a terminal setting history to the user 2A. A table TS2 represents a terminal setting history to the user 2A. In one table, the terminal setting information of a plurality of terminal apparatuses 10 that the user 2 uses for image browsing is recorded.

The terminal setting history transmission unit 133 receives a transmission request of the terminal setting history corresponding to a specific user ID from the information processing server 120 through the communication unit 131. The terminal setting history transmission unit 133 extracts a requested table corresponding to the user ID from a plurality of tables (see FIG. 14), which are recorded by the terminal setting information recording unit 132, according to the transmission request of the terminal setting history. Then, the terminal setting history transmission unit 133 transmits the extracted table as the terminal setting history to the information processing server 120 through the communication unit 131.

The information processing server 120 has a communication unit 121, an authentication unit 122, a terminal setting history acquisition unit 123, a reference setting value generation unit 124, an image correction processing unit 125, a print instruction unit 126, and the like. The communication unit 121 connects the information processing server 120 to the network N using the communication I/F 205 and performs communication with the information collection server 130, the image storage server 110, the terminal apparatus 10, and the like.

The authentication unit 122 receives the authentication information, which is transmitted from the terminal apparatus 10, through the communication unit 121 and executes authentication processing of the user 2. Furthermore, the authentication unit 122 transmits the authentication information received from the terminal apparatus 10 to the image storage server 110. In addition, the authentication unit 122 transmits an authentication result to the terminal apparatus 10 through the communication unit 121.

In a case where the user 2 performs an operation to start a print order, the terminal setting history acquisition unit 123 transmits the above-described transmission request of the terminal setting history to the information collection server 130 through the communication unit 121. For example, in a case where the print order screen 40 (see FIG. 8) is displayed according to an operation of the user 2, the terminal apparatus 10 transmits the user ID of the user 2 to the information processing server 120. The terminal setting history acquisition unit 123 requests the information collection server 130 to transmit the terminal setting history corresponding to the user ID received from the terminal apparatus 10 through the communication unit 121.

The terminal setting history acquisition unit 123 supplies the terminal setting history (table) received from the information collection server 130 through the communication unit 121 to the reference setting value generation unit 124.

The reference setting value generation unit 124 generates the reference setting value based on the terminal setting history supplied from the terminal setting history acquisition unit 123. As described above, the reference setting value is the terminal setting value having the longest image browsing time among a plurality of terminal setting values (display brightness values) included in the terminal setting history.

Figure 15:
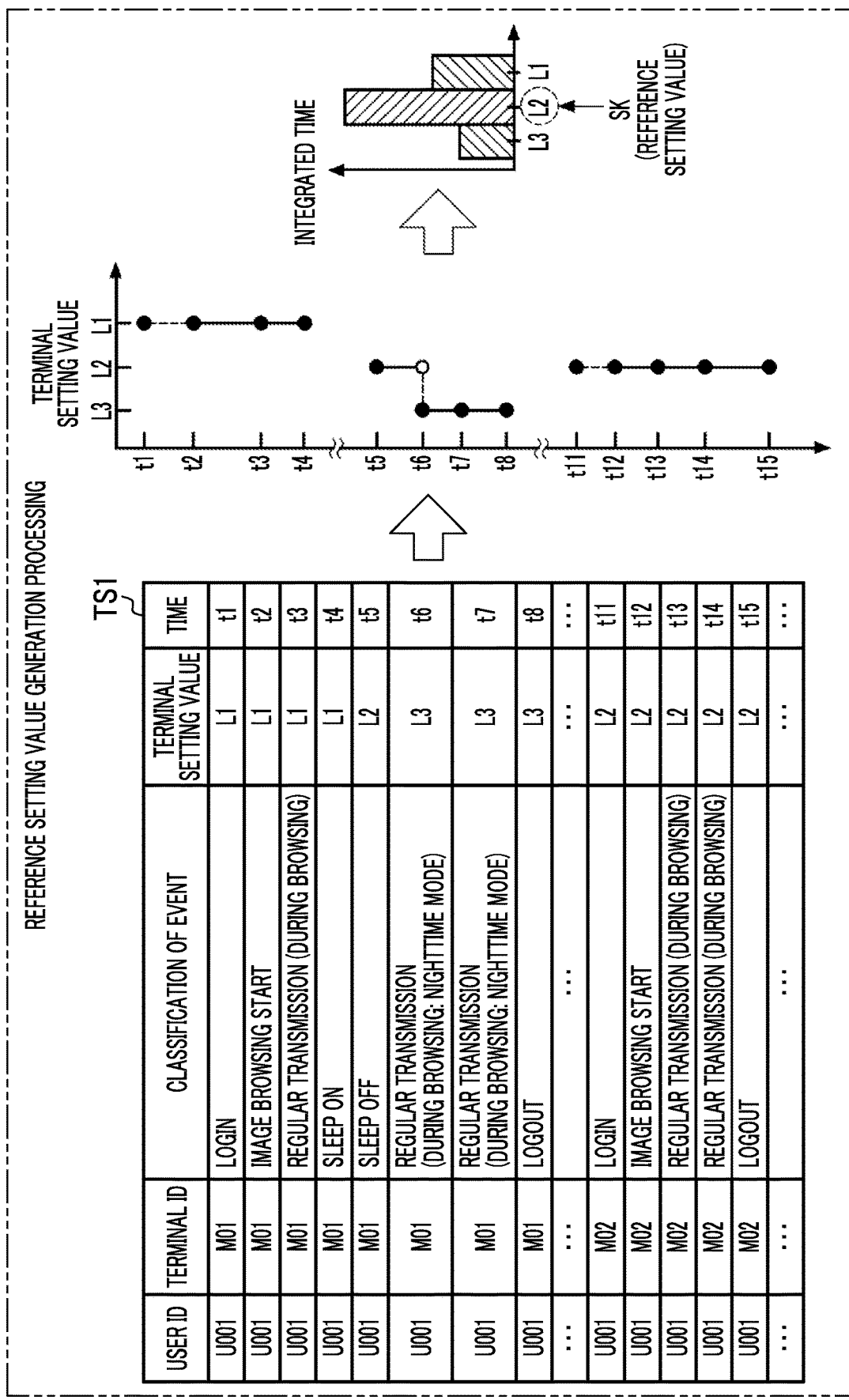
FIG. 15 is a diagram showing an example of a reference setting value generation processing method.

FIG. 15 is a diagram showing an example of a reference setting value generation processing method. FIG. 15 shows an example where a reference setting value SK is generated based on the table TS1. First, the reference setting value generation unit 124 specifies an image browsing period based on the table TS1. A period corresponding to a solid line in a graph of FIG. 15 corresponds to the image browsing period.

Next, the reference setting value generation unit 124 obtains an integrated time of the image browsing period for each terminal setting value. Note that the integrated time is calculated by integrating the image browsing period without distinction between the terminal IDs. Furthermore, in this case, the reference setting value generation unit 124 does not integrate a period from sleep on to sleep off (a period from a time t4 to a time t5 of FIG. 15).

Then, the reference setting value generation unit 124 specifies the terminal setting value (in the example of FIG. 4, L2) having a longest integrated time as a reference setting value.

The reference setting value generation unit 124 transmits the specified reference setting value to the terminal apparatus 10 through the communication unit 121.

The image correction processing unit 125 receives the print order information transmitted from the terminal apparatus 10 through the communication unit 121 and corrects the characteristic of the print target image based on the print target image and the correction value included in the print order information. Correction processing of the print target image by the image correction processing unit 125 is the same as the correction processing described referring to FIG. 13. The correction value corresponds to a difference between the reference setting value and the terminal setting value of the terminal apparatus 10 where the print target image is selected.

Furthermore, the image correction processing unit 125 holds color profile information of the printer 140 and performs color correction of the print target image based on the color profile information. In a case where there are a plurality of printers 140, the image correction processing unit 125 holds color profile information corresponding to each printer 140 and selects the color profile information corresponding to the printer 140 that executes print, to perform correction.

The print instruction unit 126 performs a print instruction to the printer 140 by transmitting the print target image after correction corrected by the image correction processing unit 125 as print data to the printer 140.

Figure 16:
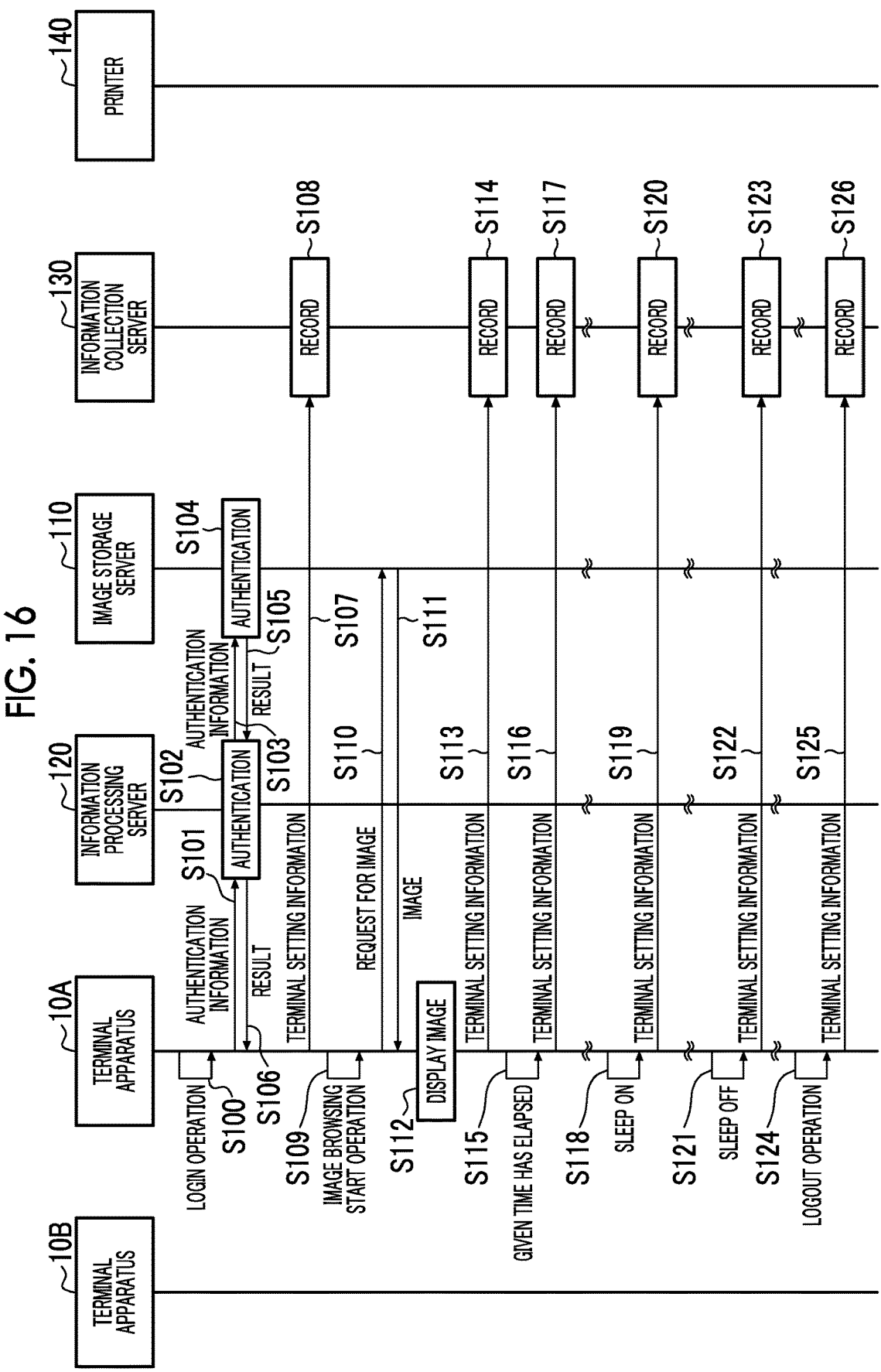
FIG. 16 is a sequence diagram showing an example of a flow of processing at the time of image browsing.
Figure 17:
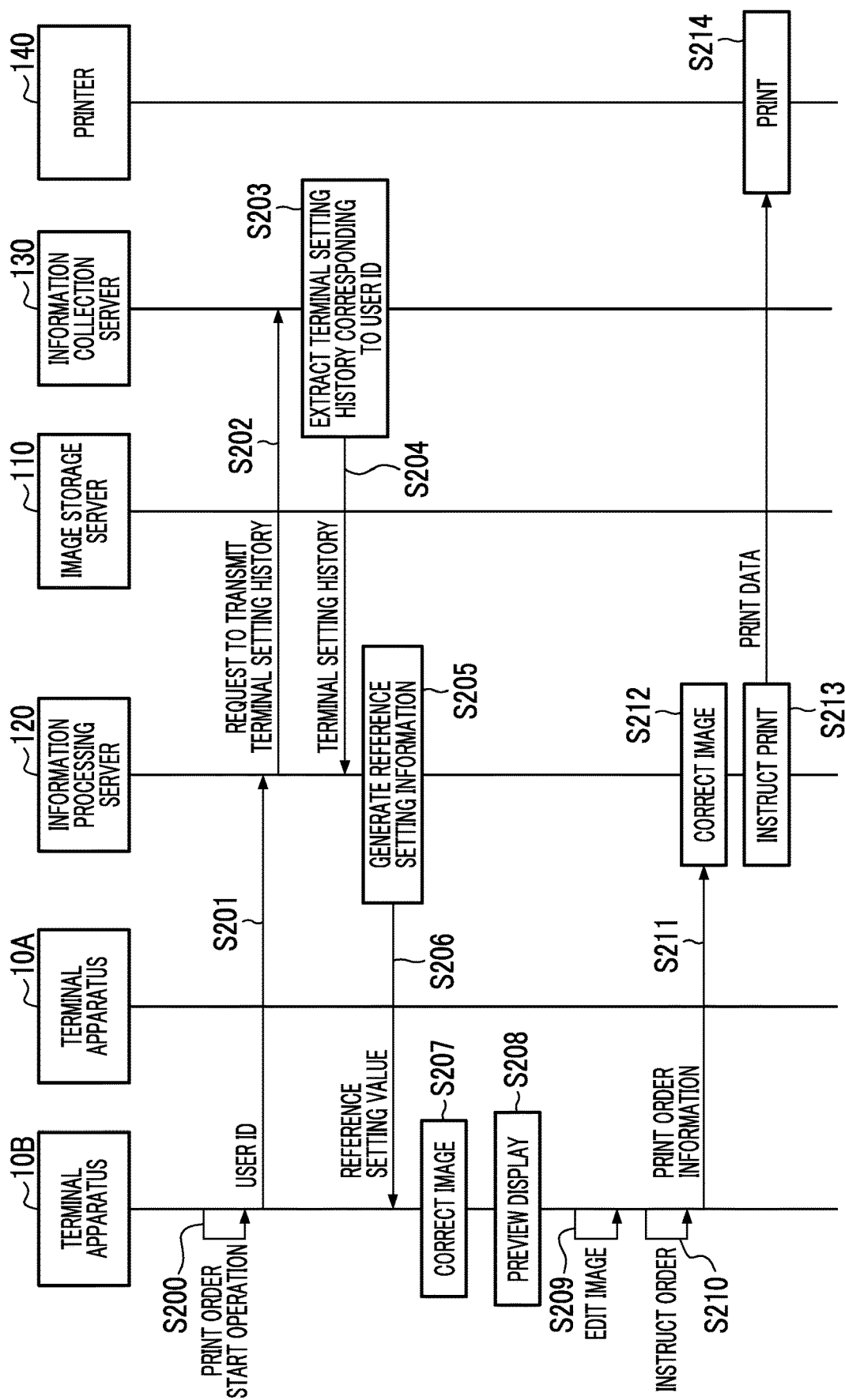
FIG. 17 is a sequence diagram showing an example of a flow of processing at the time of a print order.

Next, a flow of print support processing by the print support apparatus 150 will be described. FIG. 16 is a sequence diagram showing an example of a flow of processing at the time of image browsing. FIG. 17 is a sequence diagram showing an example of a flow of processing at the time of a print order.

FIG. 16 shows a flow of processing in a case where the user 2A browses images stored in the image storage server 110 using the terminal apparatus 10A. First, the user 2A performs a login operation using the login screen 30 (see FIG. 5) (Step S100). In a case where the user 2A inputs the user ID and the password, and then, depresses the OK button 33, the authentication information transmission unit 12 of the terminal apparatus 10A transmits authentication information to the information processing server 120 (Step S101).

The authentication unit 122 of the information processing server 120 executes authentication processing based on the authentication information received from the terminal apparatus 10A (Step S102), and transmits the authentication information to the image storage server 110 (Step S103). The authentication unit 112 of the image storage server 110 performs authentication processing based on the authentication information (Step S104), and transmits an authentication result to the information processing server 120 (Step S105). The authentication unit 122 of the information processing server 120 receives the authentication result from the information processing server 120, and then, transmits the authentication result to the terminal apparatus 10A (Step S106).

In a case where determination is made that the login is completed based on the authentication result, the terminal apparatus 10A transmits the terminal setting information to the information collection server 130 with the terminal setting information transmission unit 15 (Step S107). The information collection server 130 records the terminal setting information received from the terminal apparatus 10A (Step S108).

Next, in a case where the user 2A performs an image browsing start operation using the image browsing screen 25 (Step S109), the image acquisition unit 13 requests the image storage server 110 to transmit images (Step S110). The image storage server 110 receives the request from the image acquisition unit 13 of the terminal apparatus 10A, extracts images (see FIG. 6) associated with the user ID from the image DB 113, and transmits the extracted images to the terminal apparatus 10A (Step S111).

In the terminal apparatus 10A, the image browsing processing unit 14 displays the images acquired from the image storage server 110 by the image acquisition unit 13 on the image browsing screen 25 (see FIG. 7) (Step S112). In a case where the images are displayed on the image browsing screen 25, the terminal setting information transmission unit 15 determines that image browsing is started and transmits the terminal setting information (see FIG. 9) to the information collection server 130 (Step S113). The information collection server 130 records the terminal setting information received from the terminal apparatus 10A (Step S114).

Next, the terminal setting information transmission unit 15 transmits the terminal setting information to the information collection server 130 (Step S116) in a case where a given time has elapsed after image browsing is started (Step S115). The information collection server 130 records the terminal setting information received from the terminal apparatus 10A (Step S117). The terminal setting information transmission unit 15 transmits the terminal setting information to the information collection server 130 each time the given time elapses.

In a case where the terminal apparatus 10A transits to the sleep mode (Step S118), the terminal setting information transmission unit 15 transmits the terminal setting information to the information collection server 130 (Step S119). The information collection server 130 records the terminal setting information received from the terminal apparatus 10A (Step S120). Thereafter, in a case where the terminal apparatus 10A is released from the sleep mode (Step S121), the terminal setting information transmission unit 15 transmits the terminal setting information to the information collection server 130 (Step S122). The information collection server 130 records the terminal setting information received from the terminal apparatus 10A (Step S123).

Then, in a case where the user 2A performs a logoff operation (Step S124), the terminal setting information transmission unit 15 transmits the terminal setting information to the information collection server 130 (Step S125). The information collection server 130 records the terminal setting information received from the terminal apparatus 10A (Step S126).

As above, in a case where the user 2A browses the images using the terminal apparatus 10A, and in a case where various events occur within a period including the image browsing period, the terminal setting information is transmitted to the information collection server 130. Similarly, even in a case where the user 2A browses the images using the terminal apparatus 10B, the terminal setting information is transmitted to the information collection server 130 in a case where various events occur. In the information collection server 130, the terminal setting information is accumulated for each user ID, and is recorded as the terminal setting history in a form of a table for each user ID (see FIG. 14).

FIG. 17 shows a flow of processing in a case where the user 2A performs a print order of an image using the terminal apparatus 10B. The print order is started by the user 2A performing an operation (print order start operation) to display the print order screen 40 (see FIG. 8) in a period during which the user 2A browses the images on the image browsing screen 25 (for example, a period from Step S112 to Step S118 of FIG. 16). The print target image is selected on the print order screen 40.

In a case where the user 2 performs the print order start operation (Step S200), the reference setting value acquisition unit 16 of the terminal apparatus 10B transmits the user ID of the user 2A to the information processing server 120 (Step S201). The terminal setting history acquisition unit 123 of the information processing server 120 requests the information collection server 130 to transmit the terminal setting history corresponding to the received user ID (Step S202).

The terminal setting history transmission unit 133 of the information collection server 130 extracts the requested terminal setting history corresponding to the user ID (Step S203), and transmits the extracted terminal setting history (for example, the table TS1 shown in FIG. 14) to the information processing server 120 (Step S204).

The reference setting value generation unit 124 of the information processing server 120 specifies the terminal setting value having a longest image browsing time based on the terminal setting history received from the information collection server 130 (see FIG. 15), and sets the specified terminal setting value (in the example shown in FIG. 15, L2) as a reference setting value (Step S205). The information processing server 120 transmits the reference setting value generated by the reference setting value generation unit 124 to the terminal apparatus 10B (Step S206).

In a case where the reference setting value acquisition unit 16 acquires the reference setting value, as shown in FIG. 13, the image correction processing unit 17 of the terminal apparatus 10B corrects the brightness value of the print target image based on the reference setting value and the current terminal setting value of the terminal apparatus 10B (Step S207). With this, an image with corrected brightness is displayed as a preview on the print order screen 40 (Step S208). The user 2A suitably edits the image on the print order screen 40 (Step S209). Then, in a case where the user 2A depresses the order execute button 41 on the print order screen 40 (Step S210), the print order information transmission unit 18 transmits the print order information to the information processing server 120 (Step S211).

The image correction processing unit 125 of the information processing server 120 corrects the characteristic of the print target image based on the print target image and the correction value included in the print order information (Step S212). Furthermore, the image correction processing unit 125 performs color correction on the print target image based on the color profile information of the printer 140 that executes print.

Thereafter, the print instruction unit 126 transmits the print target image after correction corrected by the image correction processing unit 125 as print data to the printer 140 (Step S213). The printer 140 executes a print operation based on the print data received from the print instruction unit 126 (Step S214).

As above, with the print support apparatus 150 of the above-described embodiment, it is possible to appropriately correct the print target image according to an image browsing situation of the user.

Second Embodiment

Next, a second embodiment of the present disclosure will be described. In the second embodiment, the brightness of the print target image can be adjusted through an operation on the print order screen 40. The operation is performed, for example, in Step S209 of the sequence shown in FIG. 17.

Figure 18:
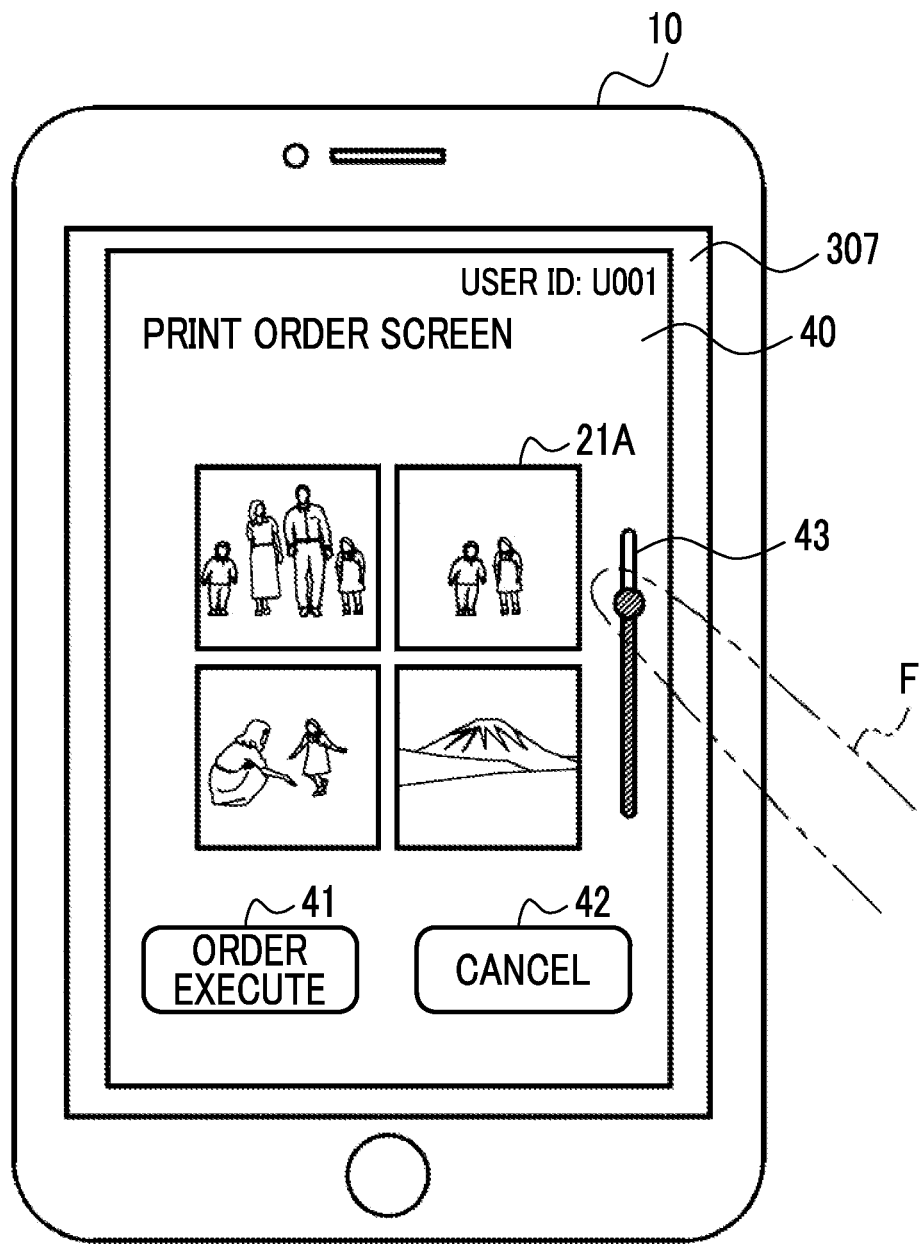
FIG. 18 is a diagram showing a print order screen according to a second embodiment.

In the embodiment, for example, as shown in FIG. 18, the image browsing processing unit 14 of the terminal apparatus 10 displays, on the print order screen 40, a slide bar 43 as an operation unit that adjusts the brightness of the print target image. The user 2 can adjust the brightness of the print target image by operating the slide bar 43 with the finger F.

Figure 19:
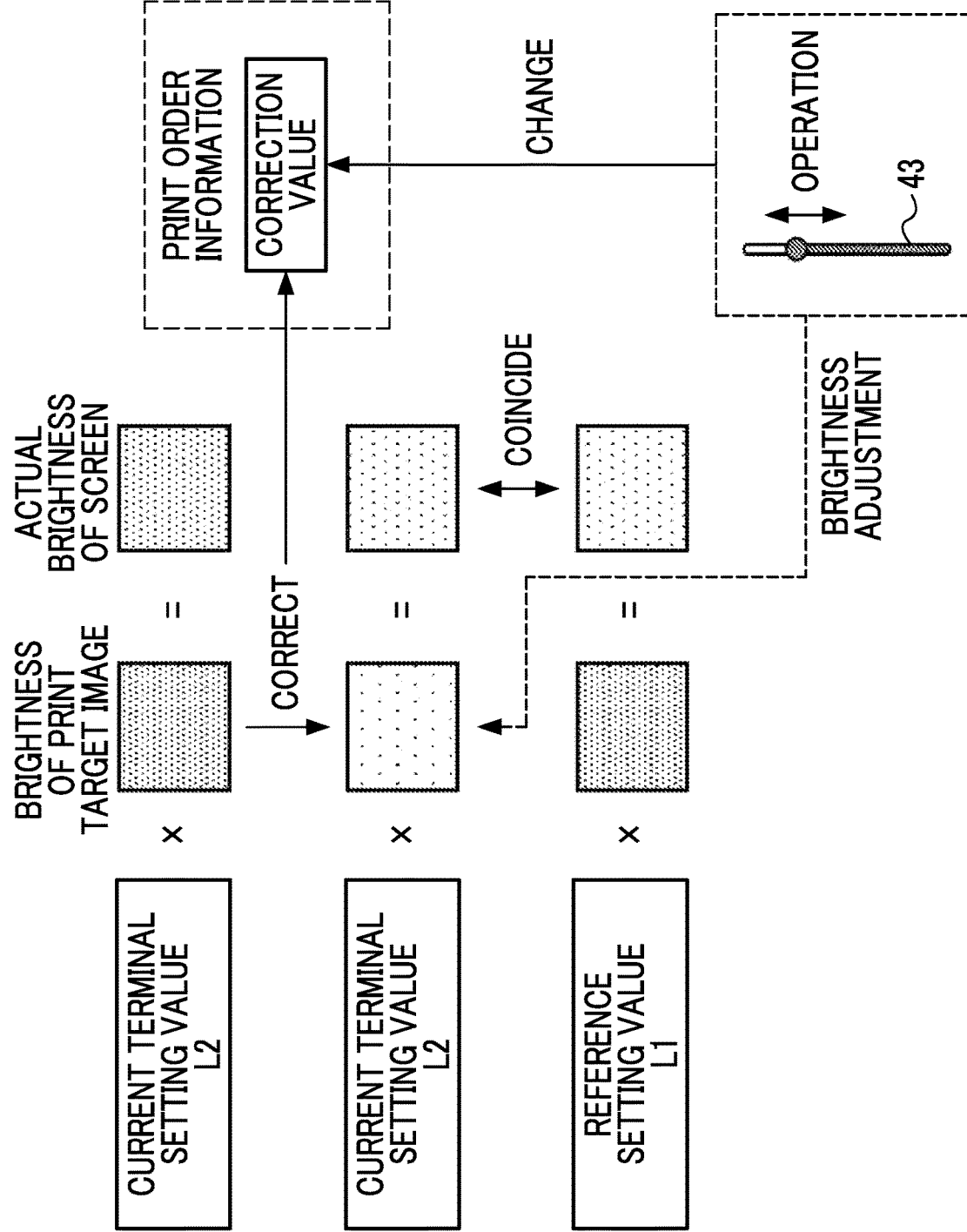
FIG. 19 is a diagram showing a correction method of an image according to the second embodiment.

In the embodiment, as shown in FIG. 19, the image correction processing unit 17 changes the correction value of the print target image, which is corrected based on the reference setting value and the current terminal setting value of the terminal apparatus 10, based on an operation amount of the slide bar 43. The brightness of the print target image that is displayed on the print order screen 40 is changed with the change in correction value.

The user 2 can perform an order instruction by operating the slide bar 43 to adjust the brightness of the print target image, and then, depressing the order execute button 41. In the embodiment, in a case where the correction value is changed, the print order information transmission unit 18 transmits print order information including the correction value after change to the information collection server 130. Other configurations of the embodiment are the same as the configurations of the first embodiment.

Note that the characteristic of the print target image may be adjusted individually on each of a plurality of images included in the print target.

Third Embodiment

Next, a third embodiment of the present disclosure will be described. In the third embodiment, execution or non-execution of the correction of the print target image using the reference setting value is selectable on the print order screen 40. The selection operation is performed, for example, in Step S209 of the sequence shown in FIG. 17.

Figure 20:
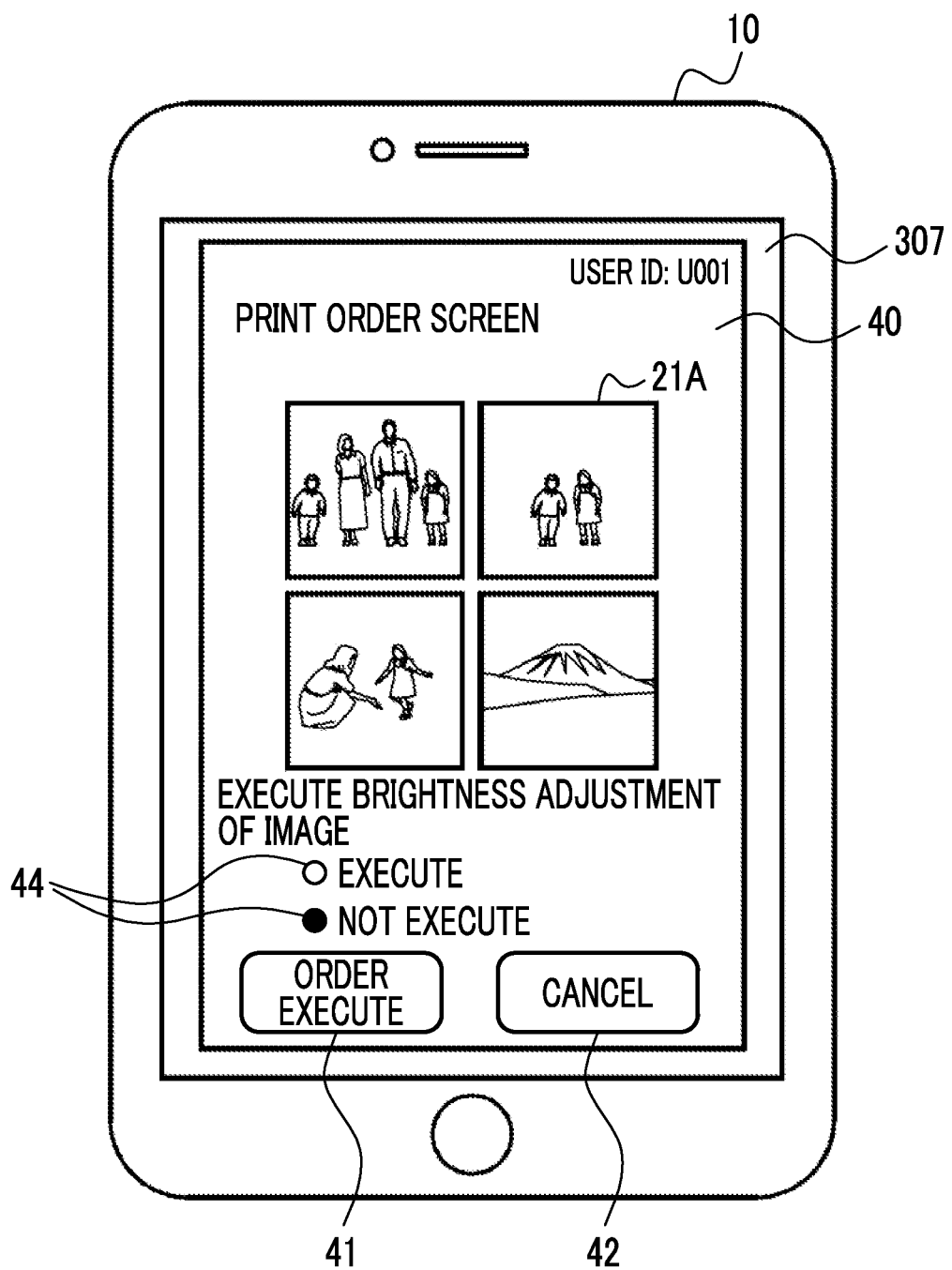
FIG. 20 is a diagram showing a print order screen according to a third embodiment.

In the embodiment, for example, as shown in FIG. 20, the image browsing processing unit 14 of the terminal apparatus 10 displays, on the print order screen 40, a pair of select buttons 44 for selecting whether or not the image correction processing unit 17 executes the correction of the brightness of the print target image. The user 2 can select the execution or non-execution of the correction by depressing one of the pair of select buttons 44 through a touch operation.

In a case where the user 2 selects to execute the correction, the image correction processing unit 17 corrects the print target image based on the reference setting value and the current terminal setting value of the terminal apparatus 10 through the same correction processing as in the first embodiment (see FIG. 13). In this case, the print target image is printed with brightness corresponding to the reference setting value.

On the other hand, in a case where the user 2 selects not to execute the correction, the image correction processing unit 17 does not execute the correction processing. In this case, the print target image is printed with brightness corresponding to the current terminal setting value of the terminal apparatus 10 that tries to perform a print order.

Fourth Embodiment

Next, a fourth embodiment of the present disclosure will be described. In the fourth embodiment, in a case where the reference setting value is different from the current terminal setting value of the terminal apparatus 10 where the print target image is selected, a warning is notified on the print order screen 40. The warning notification is performed, for example, in Step S208 of the sequence shown in FIG. 17.

Figure 21:
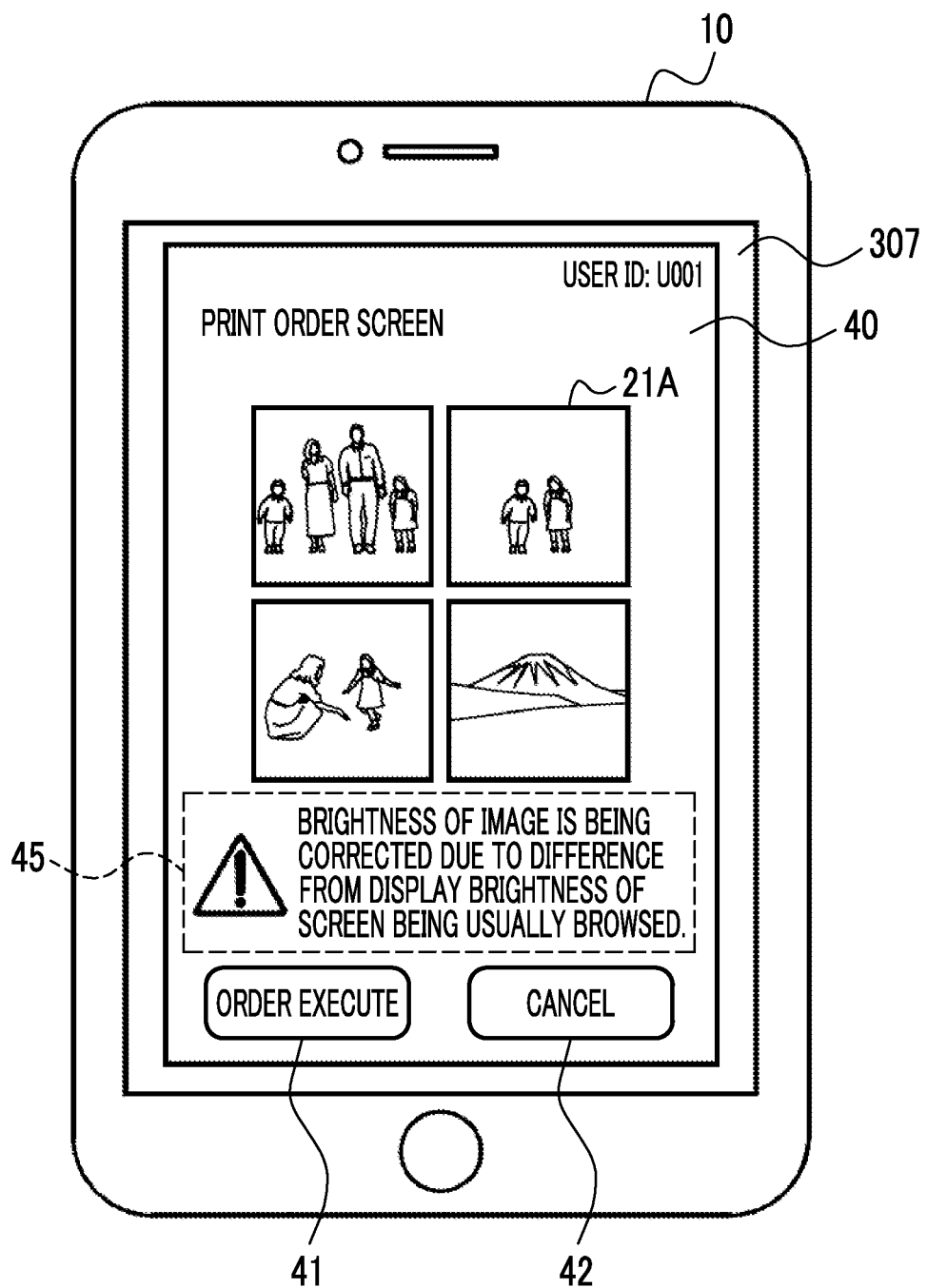
FIG. 21 is a diagram showing a print order screen according to a fourth embodiment.

In the embodiment, for example, as shown in FIG. 21, in a case where the reference setting value and the current terminal setting value of the terminal apparatus 10 are different by a given value or more, the image browsing processing unit 14 of the terminal apparatus 10 displays a message 45 for notifying of a warning on the print order screen 40. The given value may be a value greater than zero.

The message 45 represents that the display brightness of the screen on which the user 2 usually browses is different from the current terminal setting value, and thus, the correction processing (see FIG. 13) based on the reference setting value and the current terminal setting value is executed to the print target image. With this, the user 2 can recognize that an image to be printed is corrected before executing a print order.

In the embodiment, a print target image 21A after correction by the image correction processing unit 17 is displayed on the print order screen 40 along with the message 45. The warning notification of the embodiment is not limited to the display on the print order screen 40, and may be performed by a method, such as an output of voice from the speaker unit 308 (see FIG. 3).

Figure 22:
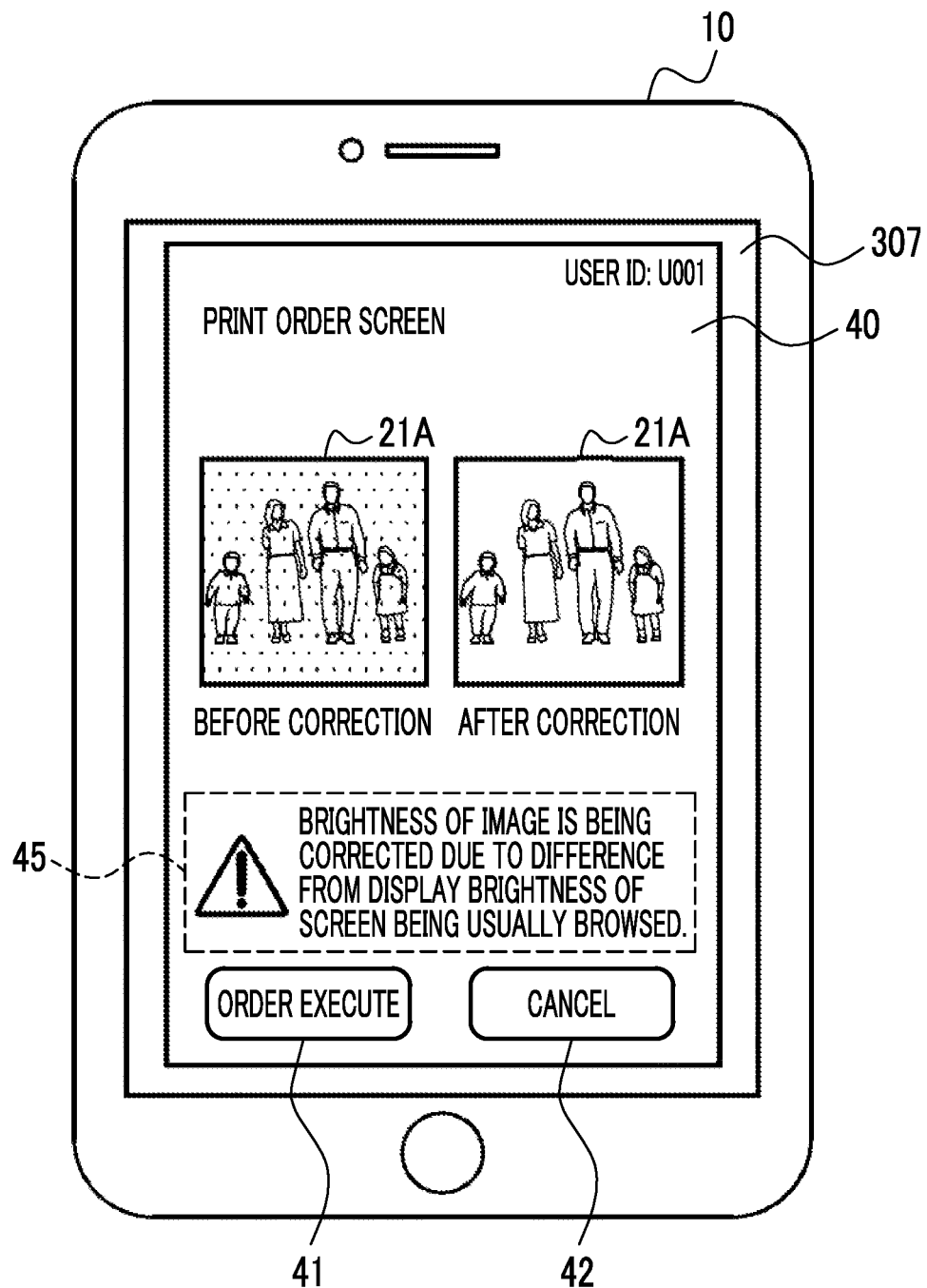
FIG. 22 is a diagram showing a print order screen according to a modification example of the fourth embodiment.

As a modification example of the fourth embodiment, as shown in FIG. 22, the print target image 21A before correction and the print target image 21A after correction by the image correction processing unit 17 may be displayed on the print order screen 40 along with the message 45.

Note that the warning notification of the embodiment may be performed by the information processing server 120. The information processing server 120 can determine the difference between the reference setting value and the current terminal setting value of the terminal apparatus 10 based on the correction value included in the print order information.

Fifth Embodiment

Next, a fifth embodiment of the present disclosure will be described. In the fifth embodiment, the reference setting value generation unit 124 of the information processing server 120 converts the terminal setting value included in the terminal setting history using a conversion table, and then, generate a reference setting value.

It is considered that, even though the setting value of the display brightness as the terminal setting value is identical among a plurality of terminal apparatuses 10, actual display brightness emitted from the display unit 304 is different. A conversion table that is used by the reference setting value generation unit 124 in the embodiment is a table for correcting a difference in actual screen brightness among the terminal apparatuses. The conversion table can be created by measuring the brightness of the screen of the display unit 304, on which the same image is displayed with the same terminal setting value, in each of a plurality of terminal apparatuses 10.

Figure 23:
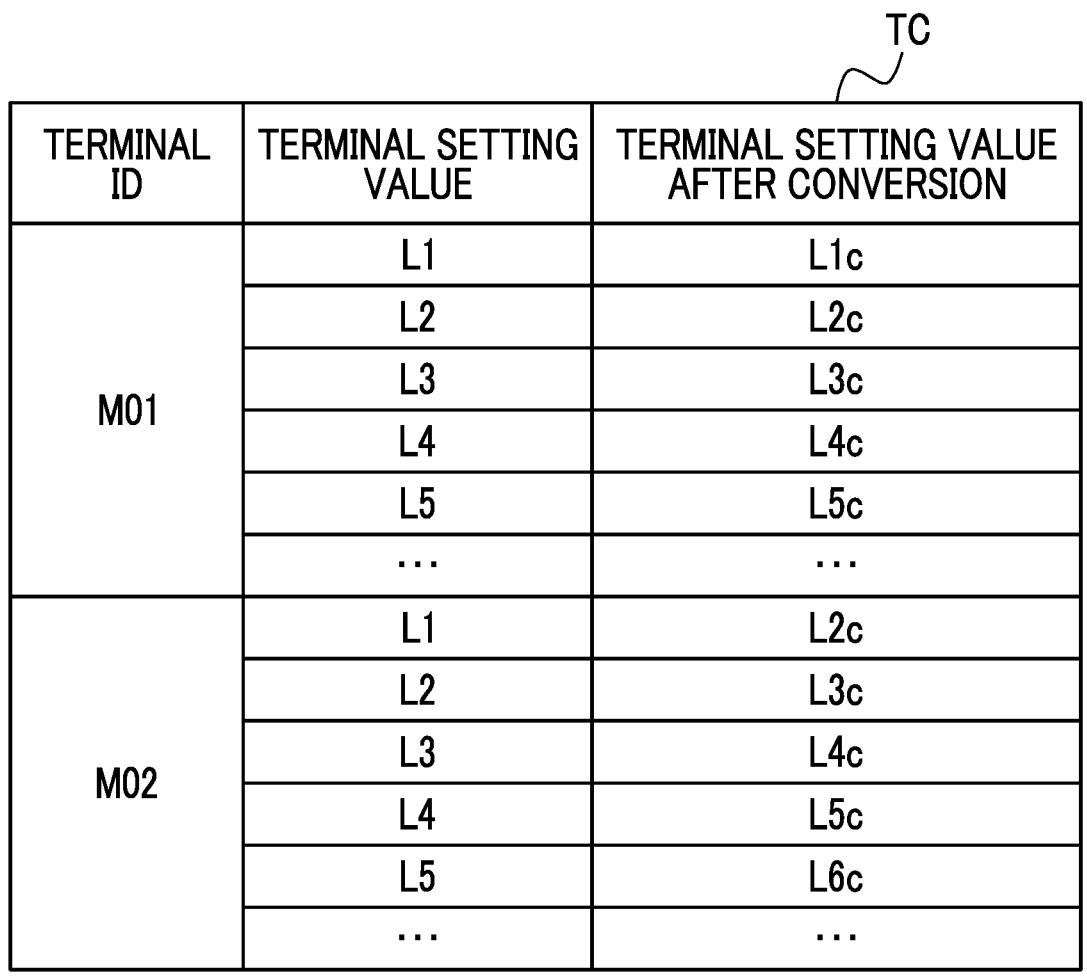
FIG. 23 is a diagram showing an example of a conversion table.

FIG. 23 is a diagram showing an example of the conversion table. A conversion table TC shown in FIG. 23 is a look-up table indicating correspondence between a terminal setting value in each of a plurality of terminal apparatuses 10 and a terminal setting value after conversion. In the example shown in FIG. 23, in regards to a terminal setting value L1 of the terminal apparatus 10B (terminal ID: M02) and a terminal setting value L2 of the terminal apparatus 10A (terminal ID: M01), screen brightness is the same, and the terminal setting value after conversion is identical (L2c).

For example, in performing the reference setting value generation shown in FIG. 15, the reference setting value generation unit 124 generates the reference setting value using the terminal setting value after conversion obtained by converting the terminal setting value included in the table TS1 using the conversion table TC. Other processing is the same as in the first embodiment.

Note that the conversion table may be held in the information collection server 130 or conversion processing of the terminal setting value may be executed in the information collection server 130. The conversion processing may be performed until the reference setting value generation processing is executed. Alternatively, in a case where there is no terminal setting value corresponding to the terminal setting value to be converted in the conversion table, a terminal setting value may be obtained by interpolation or a closest terminal setting value may be selected.

Sixth Embodiment

Next, a sixth embodiment of the present disclosure will be described. In the sixth embodiment, the terminal setting history that is held in the information collection server 130 is updated at a specific timing.

Figure 24:
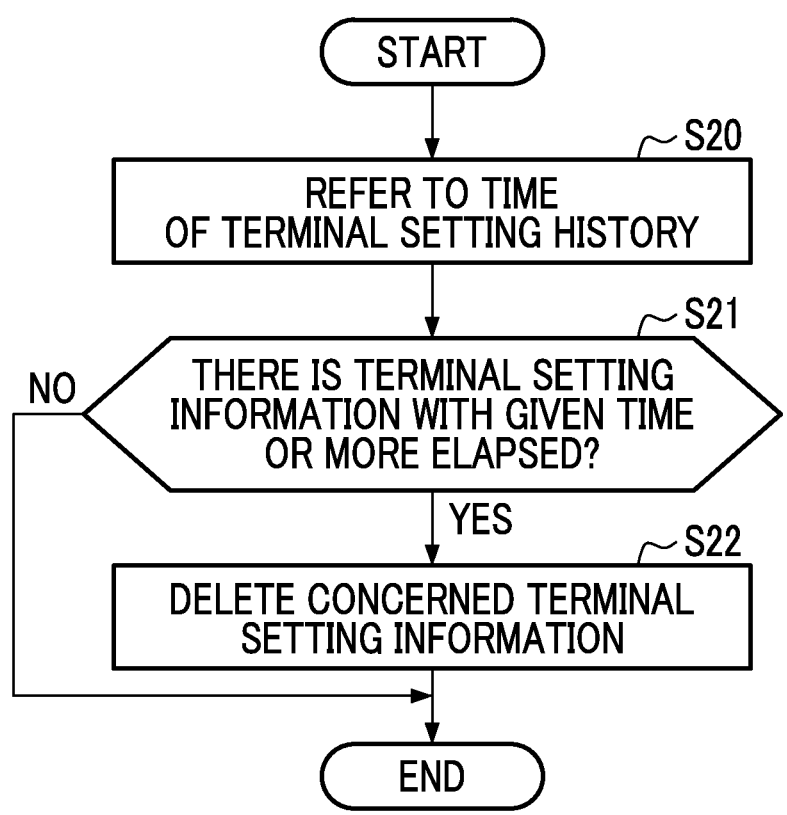
FIG. 24 is a flowchart showing an example of update processing of a terminal setting history.

In the embodiment, for example, the terminal setting information recording unit 132 executes update processing shown in FIG. 24 regularly. As shown in FIG. 24, the terminal setting information recording unit 132 first refers to the time included in each piece of the terminal setting information in the terminal setting history (see FIG. 14) (Step S20). Next, the terminal setting information recording unit 132 determines whether or not there is terminal setting information with a given elapsed time or more after recording the terminal setting information in the terminal setting history (Step S21).

In a case where determination is made that there is the terminal setting information with the given elapsed time or more (Step S21: YES), the terminal setting information recording unit 132 deletes the concerned terminal setting information from the terminal setting history (Step S22), and ends the update processing. On the other hand, in a case where determination is made that there is no terminal setting information with the given elapsed time or more (Step S21: NO), the terminal setting information recording unit 132 skips Step S22 and ends the update processing.

The processing in the terminal setting history transmission unit 133 is the same as in the first embodiment. With the embodiment, old terminal setting information with the given elapsed time or more is deleted regularly. With this, it is possible to appropriately correct the print target image according to a latest image browsing situation of the user 2. The user 2 often forgets brightness of images browsed in the past and leaves a strong impression on brightness of images browsed recently. For this reason, according to the embodiment, a print image with brightness conforming to the impression of the user 2 is obtained.

Note that the timing of updating the terminal setting history is not limited to the above-described timing. For example, in a case where the terminal apparatus 10 that is used by the user 2 is changed to another terminal apparatus 10 due to model change or the like, the terminal setting information corresponding to the terminal apparatus 10 before change may be deleted.

Specifically, in a case where application information of the terminal apparatus 10 that is used by the user 2 is transferred to another terminal apparatus 10, the terminal setting information corresponding to the terminal apparatus 10 before transfer may be deleted. Furthermore, in a case where the user 2 newly logs in using a new terminal apparatus 10, the terminal setting information corresponding to the old terminal apparatus 10 may be deleted. In addition, the user 2 may delete the terminal setting information corresponding to the terminal apparatus 10 before change when a predetermined time has elapsed after model change of the terminal apparatus 10.

Seventh Embodiment

Next, a seventh embodiment of the present disclosure will be described. In the respective embodiments described above, the reference setting value generation unit 124 integrates the image browsing time for each terminal setting value and specifies the terminal setting value having the longest integrated time as the reference setting value. In the seventh embodiment, the reference setting value generation unit 124 performs weighting to each image browsing period in integrating the image browsing period.

For example, the reference setting value generation unit 124 specifies a size of an image browsed in each image browsing period and makes the weight greater as the image size is greater. In the example, the terminal setting information transmission unit 15 of the terminal apparatus 10 transmits terminal setting information including the image size. With this, a terminal setting value to a period during which an image of a large image size is browsed is easily specified as a reference setting value. The user 2 often leaves a strong impression on brightness or the like of an image of a large image size. For this reason, according to the embodiment, a print image with brightness conforming to the impression of the user 2 is obtained.

Note that the reference setting value generation unit 124 may perform weighting based on positional information where an image is captured, instead of an image size. In the example, the terminal setting information transmission unit 15 of the terminal apparatus 10 transmits terminal setting information including positional information obtained by the GPS reception unit 307. For example, the reference setting value generation unit 124 makes the weight greater as a distance between positional information of the terminal apparatus 10 where the print order start operation is performed and positional information of an image that is browsed in each image browsing period is smaller.

With this, a terminal setting value to a period during which an image captured at a position close to the terminal apparatus 10 where the user 2 executes the print order is browsed is easily specified as a reference setting value. The user 2 often leaves a stronger impression on brightness or the like of an image captured at a place close to a current position, and thus, a print image with brightness conforming to the impression of the user 2 is obtained.

The reference setting value generation unit 124 may perform weighting based on a time from when an image is captured until the captured image is browsed. For example, as the time from when the image is captured until the captured image is browsed is shorter, the weight is made greater. With this, a terminal setting value to an image browsing period during which the user 2 browses an image immediately after capturing the image is easily specified as a reference setting value. The user 2 often leaves a stronger impression on brightness or the like of an image that is started to be browsed immediately after imaging, and thus, a print image with brightness conforming to the impression of the user 2 is obtained.

Eighth Embodiment

Next, an eighth embodiment of the present disclosure will be described. In the respective embodiments described above, although the terminal setting value is the setting value of the display brightness of the display unit 304, in the eighth embodiment, the terminal setting value is a setting value of color information of the display unit 304. In the embodiment, it is assumed that the color information is RGB information of red (R), green (G), and blue (B).

In the embodiment, the image correction processing unit 17 of the terminal apparatus 10 and the image correction processing unit 125 of the information processing server 120 correct the color of the print target image. The image browsing screen 25 enables color adjustment of the print target image on the print order screen 40.

In addition, in the embodiment, a conversion table (see FIG. 23) that is used by the reference setting value generation unit 124 is a three-dimensional look-up table indicating correspondence between color setting values of the RGB information in a plurality of terminal apparatuses 10 and a color setting value after conversion.

MODIFICATION EXAMPLES

In the respective embodiments described above, although the terminal setting information recording unit 132 records the terminal setting information in a form of a table for each user ID as shown in FIG. 14, the terminal setting information may be recorded in one table without being divided for each user ID. FIG. 25 shows an example of a table that records terminal setting information to a plurality of user IDs. In a table TS shown in FIG. 25, terminal setting information to the user ID "U001" and terminal setting information to the user ID "U002" are recorded.

In the respective embodiments described above, although the terminal setting information transmission unit 15 transmits the terminal setting information in a case where login, image browsing start, a lapse of a given time, sleep on, sleep off, and logout occurs as the event, the terminal setting information may be transmitted at other timings. For example, the terminal setting information may be transmitted at a timing at which the mode, such as the nighttime mode, is turned on or off. Furthermore, mode change information may be included in the terminal setting information.

In addition, the terminal setting information transmission unit 15 may transmit the terminal setting information in a case where the terminal setting value (display brightness or color information) is changed.

In the respective embodiments described above, although the image browsing processing unit 14 of the terminal apparatus 10 displays the images acquired from the image storage server 110 by the image acquisition unit 13 on the image browsing screen 25, the image browsing processing unit 14 of the terminal apparatus 10 may display images captured by the camera unit 305 and stored in the storage unit 19 of the terminal apparatus 10 on the image browsing screen 25.

Alternatively, the reference setting value generation unit 124 of the information processing server 120 may generate the reference setting value through the following processing, instead of the reference setting value generation processing described referring to FIG. 15. The reference setting value generation unit 124 first refers to the terminal setting history (see FIG. 14) and specifies the terminal apparatus 10 and the terminal setting information having a longest image browsing time. The terminal setting value included in the terminal setting information is converted using a conversion table TC shown in FIG. 23. Then, the reference setting value generation unit 124 specifies the terminal setting value after conversion as the reference setting value.

The information processing server 120 and the information collection server 130 in the respective embodiments described above may be configured of one server. Furthermore, the image storage server 110, the information processing server 120, and the information collection server 130 may be configured of one server.

In addition, the information processing server 120 may be divided into a first information processing server having the print instruction unit 126 and a communication unit of the information processing server 120 and a second information processing server having the functions other than the print instruction unit 126 of the information processing server 120. In this case, the first information processing server functions as a print instruction server, and the second information processing server and the information collection server 130 function as an image processing apparatus.

The image processing apparatus corrects the characteristic of the print target image with the image correction processing unit 125. The print instruction server receives the corrected print target image after correction from the image processing apparatus through the communication unit. Then, the print instruction server transmits the print target image after correction received from the image processing apparatus with the print instruction unit 126 and transmits the print target image after correction as print data to the printer 140 with the print instruction unit 126.

In the respective embodiments, the hardware structures of processing units that execute various kinds of processing included in the print service providing system 100 are various processors described below. In the respective embodiments described above, each of the image storage server 110, the information processing server 120, and the information collection server 130 is configured of the computer 200, and a plurality of processors 201 included in each computer 200 corresponds to the processor of the print service providing system 100. The number of computers 200 included in the print service providing system 100 and the number of processors 201 of the computer 200 are not limited to three, and may be an integer equal to or greater than one.

Various processors include a CPU, a programmable logic device (PLD), a dedicated electric circuit, and the like. The CPU is a general-purpose processor that executes software (program) to function as various processing units as well-known in the art. The PLD is a processor capable of changing a circuit configuration after manufacture, such as a field programmable gate array (FPGA). The dedicated electric circuit is a processor having a circuit configuration dedicatedly designed for executing specific processing, such as an application specific integrated circuit (ASIC).

One processing unit may be configured of one of various processors described above or may be configured of a combination of two or more processors (for example, a plurality of FPGAs or a combination of a CPU and an FPGA) of the same type or different types. A plurality of processing units may be configured of one processor. As an example where a plurality of processing units are configured of one processor, first, there is a form in which one processor is configured of a combination of one or more CPUs and software, and the processor functions as a plurality of processing units. Second, as represented by system on chip (SoC) or the like, there is a form in which a processor that implements all functions of a system including a plurality of processing units into one IC chip is used. In this way, various processing units may be configured using one or more processors among various processors described above as a hardware structure.

In addition, the hardware structure of various processors is, more specifically, an electric circuit (circuitry), in which circuit elements, such as semiconductor elements, are combined.

From the above description, it is possible to ascertain the invention in Supplementary Item 1 described below.

Supplementary Item 1

An image processing apparatus comprising:
at least one processor,
in which the processor is configured to
generate a terminal setting history by receiving and recording a terminal setting value, which is transmitted in a case where a specific event occurs and is involved in image browsing, from at least one terminal apparatus,
specify the terminal setting value having a longest image browsing time as a reference setting value based on the terminal setting history, and
correct a characteristic of a print target image selected in the terminal apparatus based on the reference setting value.

The invention is not limited to the respective embodiments described above, and can of course employ various configurations without departing from the spirit and scope of the invention. In addition to the program, the invention extends to a computer readable storage medium that stores the program in a non-transitory manner.

What is claimed is:

1. A print support apparatus that receives a print target image selected in a terminal apparatus having a display unit, on which image browsing is possible, and instructs a printer to perform image print, the print support apparatus comprising:
at least one processor,
wherein the processor is configured to
generate a terminal setting history by receiving and recording a terminal setting value, which is transmitted in a case where a specific event occurs and is involved in image browsing, from at least one terminal apparatus,
specify the terminal setting value having a longest image browsing time as a reference setting value based on the terminal setting history, and
correct a characteristic of the print target image based on the reference setting value.

2. The print support apparatus according to claim 1, wherein the terminal setting value is a setting value of display brightness or color information of the display unit, and
the processor is configured to correct brightness or a color of the print target image based on the reference setting value.

3. The print support apparatus according to claim 1, wherein the terminal setting value is transmitted as the specific event from the terminal apparatus each time a given time elapses within an image browsing period of the terminal apparatus.

4. The print support apparatus according to claim 1, wherein the processor is configured to integrate an image browsing time for each terminal setting value included in the terminal setting history and specify the terminal setting value having a longest integrated time as the reference setting value.

5. The print support apparatus according to claim 1, wherein the processor is configured to specify, as the reference setting value, a terminal setting value after conversion obtained by converting the terminal setting value included in the terminal setting history based on a conversion table for converting a difference in terminal setting value among a plurality of the terminal apparatuses.

6. The print support apparatus according to claim 1, wherein the processor is configured to record terminal setting information including the terminal setting value transmitted from the terminal apparatus in the terminal setting history.

7. The print support apparatus according to claim 6, wherein the terminal setting information includes identification information of a user, identification information of the terminal apparatus, a classification of the event, and a time when the terminal setting value is acquired, in addition to the terminal setting value.

8. The print support apparatus according to claim 7, wherein the processor is configured to delete the terminal setting information with a given elapsed time or more after recording the terminal setting information in the terminal setting history based on the time.

9. The print support apparatus according to claim 7, wherein the processor is configured to extract the terminal setting history corresponding to identification information of the user of the terminal apparatus where the print target image is selected, and specify the reference setting value based on the extracted terminal setting history.

10. The print support apparatus according to claim 1, wherein the processor is configured to correct the characteristic of the print target image based on a correction value corresponding to a difference between the reference setting value and the terminal setting value of the terminal apparatus where the print target image is selected.

11. The print support apparatus according to claim 10, wherein the processor is configured to notify of a warning in a case where the reference setting value and the terminal setting value of the terminal apparatus where the print target image is selected are different by a given value or more.

12. A method of operating a print support apparatus that receives a print target image selected in a terminal apparatus having a display unit, on which image browsing is possible, and instructs a printer to perform image print, the method comprising:

generating a terminal setting history by receiving and recording a terminal setting value, which is transmitted in a case where a specific event occurs and is involved in image browsing, from at least one terminal apparatus;

specifying the terminal setting value having a longest image browsing time as a reference setting value based on the terminal setting history; and correcting a characteristic of the print target image based on the reference setting value.

13. A non-transitory computer-readable storage medium storing an operation program causing a computer to execute:

processing of receiving a print target image selected in a terminal apparatus having a display unit, on which image browsing is possible, and instructing a printer to perform image print; and processing of generating a terminal setting history by receiving and recording a terminal setting value, which is transmitted in a case where a specific event occurs and is involved in image browsing, from at least one terminal apparatus, specifying the terminal setting value having a longest image browsing time as a reference setting value based on the terminal setting history; and correcting a characteristic of the print target image based on the reference setting value.

* * * * *